United States Patent
Ogura et al.

(10) Patent No.: US 10,808,599 B2
(45) Date of Patent: Oct. 20, 2020

(54) TEMPERATURE CONTROL APPARATUS OF VEHICLE

(71) Applicant: TOYOTA JIDOSHA KABUSHIKI KAISHA, Toyota (JP)

(72) Inventors: Yoichi Ogura, Sunto-gun (JP); Kunihiko Hayashi, Odawara (JP); Yuji Miyoshi, Susono (JP); Masatoshi Yano, Hadano (JP); Yu Ofune, Kariya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 7 days.

(21) Appl. No.: 16/239,583

(22) Filed: Jan. 4, 2019

(65) Prior Publication Data
US 2019/0277184 A1  Sep. 12, 2019

(30) Foreign Application Priority Data

Mar. 12, 2018  (JP) ................................ 2018-044290

(51) Int. Cl.
   *F01P 7/16*     (2006.01)
   *B60K 11/02*    (2006.01)
   (Continued)

(52) U.S. Cl.
   CPC .............. *F01P 7/165* (2013.01); *B60K 11/02* (2013.01); *B60W 20/00* (2013.01);
   (Continued)

(58) Field of Classification Search
   CPC ............ F01P 7/16; F01P 7/165; H01M 10/61; H01M 10/613; H01M 10/62; H01M 10/625; B60K 11/02; B60W 20/00
   (Continued)

(56) References Cited

U.S. PATENT DOCUMENTS

| 2001/0040061 A1* | 11/2001 | Matuda ............... B60H 1/00278 180/68.2 |
| 2002/0043413 A1* | 4/2002 | Kimishima ............ B60H 1/323 180/68.1 |
| 2011/0206951 A1* | 8/2011 | Ford ................... H01M 10/625 429/50 |
| 2013/0226380 A1 | 8/2013 | Ando et al. |
| 2013/0280564 A1* | 10/2013 | Zheng ................. H01M 2/1077 429/62 |

(Continued)

FOREIGN PATENT DOCUMENTS

| JP | 2013-177026 | 9/2013 |
| JP | 2014-234094 | 12/2014 |
| JP | 2016-112933 | 6/2016 |

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

A temperature control apparatus of a vehicle of the invention flows a cooling medium in an engine circulation circuit and a battery circulation circuit and an activation of an engine heat exchanging system so as not to perform an engine heat exchanging when an engine temperature is lower than an engine warming end temperature and a battery temperature is lower than a predetermined battery temperature lower than a battery warming end temperature, and flows the cooling medium in the engine circulation circuit and the battery circulation circuit and the activation of the engine heat exchanging system so as to perform the engine heat exchanging when the engine temperature is lower than the engine warming end temperature, and the battery temperature is equal to or higher than the predetermined battery temperature.

7 Claims, 18 Drawing Sheets

(51) Int. Cl.
  *H01M 10/625* (2014.01)
  *H01M 10/613* (2014.01)
  *B60W 20/00* (2016.01)

(52) U.S. Cl.
  CPC ....... *H01M 10/613* (2015.04); *H01M 10/625* (2015.04); *B60W 2400/00* (2013.01); *B60W 2422/95* (2013.01); *B60W 2510/0676* (2013.01); *B60W 2510/246* (2013.01); *F01P 2025/32* (2013.01); *F01P 2025/52* (2013.01); *F01P 2050/24* (2013.01); *F01P 2070/10* (2013.01)

(58) Field of Classification Search
  USPC ....... 701/101, 102, 108, 114, 115; 180/65.2, 180/65.29
  See application file for complete search history.

(56) References Cited

U.S. PATENT DOCUMENTS

| | | | |
|---|---|---|---|
| 2013/0284127 A1* | 10/2013 | Goto | F01P 11/16 123/41.02 |
| 2014/0046524 A1* | 2/2014 | Brown | H01M 10/486 701/22 |
| 2015/0267801 A1* | 9/2015 | Bidner | F16H 57/0417 701/2 |
| 2015/0360558 A1* | 12/2015 | Maeno | B60K 11/02 180/68.4 |
| 2016/0031340 A1* | 2/2016 | Porras | H01M 10/613 701/22 |
| 2016/0101666 A1 | 4/2016 | Sugimura et al. | |
| 2016/0153343 A1* | 6/2016 | Kakehashi | B60H 1/00278 123/41.31 |
| 2017/0098875 A1* | 4/2017 | Kim | B60L 58/26 |

* cited by examiner

TEMPERATURE CONTROL APPARATUS OF VEHICLE

BACKGROUND

Field

The invention relates a temperature control apparatus of a vehicle, in particular, a temperature control apparatus for controlling temperatures of an internal combustion engine and a battery of a vehicle.

Description of the Related Art

There is known a hybrid vehicle which is driven by an internal combustion engine and an electric motor. The hybrid vehicle includes a battery for storing electric power used for activating the electric motor. Further, the hybrid vehicle includes a temperature control apparatus including a cooling water circulation circuit, in which cooling water flows for cooling the internal combustion engine and the battery for preventing temperatures of the internal combustion engine and the battery from increasing excessively.

In general, the temperature of the battery should be maintained at a temperature lower than the temperature of the internal combustion engine. There is known a hybrid vehicle provided with a temperature control apparatus including a cooling water circulation circuit, in which the cooling water flows for cooling the battery in addition to a cooling water circulation circuit, in which the cooling water flows for cooling the internal combustion engine. Hereinafter, the temperature of the battery will be referred to as "the battery temperature", and the temperature of the engine will be referred to as "the engine temperature". Further, the cooling water circulation circuit, in which the cooling water flows for cooling the battery, will be referred to as "the battery cooling circuit", and the cooling water circulation circuit, in which the cooling water flows for cooling the internal combustion engine, will be referred to as "the engine cooling circuit".

In this regard, when the battery temperature is excessively low, a performance of the battery decreases. Thus, the battery should be warmed when the battery temperature is excessively low. Similarly, when the engine temperature is excessively low, emission included in exhaust gas discharged from the internal combustion engine increases, and mechanical loss increases. As a result, an amount of fuel consumed in the internal combustion engine increases. Thus, the internal combustion engine should be warmed when the engine temperature is excessively low. For example, there is known a method for maintaining a flow rate of the cooling water flowing in the battery cooling circuit and a flow rate of the cooling water flowing in the engine cooling circuit at low flow rates, respectively as a method for warming the battery and the internal combustion engine.

When activation of the battery and operation of the internal combustion engine stop while the outside air temperature is extremely low, the battery and engine temperatures are extremely low. Therefore, when the battery and engine temperatures are extremely low, and the activation of the battery and the operation of the internal combustion engine start, the battery and the internal combustion engine should be warmed. When the temperature control apparatus warms the battery and the internal combustion engine for maintaining the performance of the battery at a high level and maintaining an amount of the emission included in the exhaust gas at a low amount, the temperature control apparatus desirably increases the battery and the engine temperatures promptly.

JP 2014-234094 A discloses a vehicle heat management system provided with a first cooling water circuit and a second cooling water circuit. In the disclosed apparatus, a temperature of the cooling water flowing in the second cooling water circuit is higher than a temperature of the cooling water flowing in the first cooling water circuit when the temperature of the cooling water flowing in the first cooling water circuit is lower than a predetermined temperature. Therefore, when, the temperature of the cooling water flowing in the first cooling water circuit is lower than the predetermined temperature, the temperature of the cooling water flowing in the first cooling water circuit can be increased by connecting the first and second cooling water circuits to each other, thereby supplying the cooling water flowing in the second cooling water circuit to the first cooling water circuit.

Accordingly, the disclosed apparatus is configured to connect the first and second cooling water circuits to each other, thereby preventing the temperature of the cooling water flowing in the first cooling water circuit from decreasing excessively when the temperature of the cooling water flowing in the first cooling water circuit is lower than the predetermined temperature.

Therefore, JP 2014-234094 A suggests a technical concept to control the temperature of the cooling water flowing in one of the cooling water circuits by connecting the cooling water circuits to each other, thereby supplying heat of the cooling water flowing in one of the cooling water circuits to the cooling water flowing in the other cooling water circuit in a system provided with the cooling water circuits.

An increasing rate of the temperature of the cooling water flowing in the engine circulation circuit is larger than an increasing rate of the temperature of the cooling water flowing in the battery circulation circuit after the battery and the internal combustion engine start to be warmed simultaneously in the temperature control apparatus provided with the battery and engine circulation circuits described above.

Therefore, a method for applying the technical concept suggested by JP 2014-234094 A to the aforementioned temperature control apparatus and connecting the battery and engine circulation circuits to each other when the battery and the internal combustion engine are requested to be warmed, may be employed as a method for increasing the battery temperature promptly after the battery and the internal combustion engine are requested to be warmed.

When the aforementioned method is employed, the increasing rate of the cooling water flowing in the engine circulation circuit decreases. Thus, an increasing rate of the engine temperature decreases. As a result, the amount of the emission included in the exhaust gas increases.

SUMMARY

The invention has been made for solving the aforementioned problems. An object of the invention is to provide a temperature control apparatus which can increase the battery temperature promptly and prevent the amount of the emission included in the exhaust gas from increasing.

A temperature control apparatus of a vehicle (100) according to the invention comprises an engine circulation circuit (11), a battery circulation circuit (21), an engine heat exchanging system (50), and an electronic control unit (90).

The engine circulation circuit (11) includes a passage (15) provided in an internal combustion engine (110) of the vehicle (100) and a passage (16) provided in a first cooling system (12). A cooling medium flows in the engine circulation circuit (11) for controlling a temperature (Teng) of the internal combustion engine (110) to a temperature within a predetermined engine temperature range (Weng).

The battery circulation circuit (21) includes a passage (25) provided in a battery (120) of the vehicle (100) and a passage (26) provided in a second cooling system (40). The cooling medium flows in the battery circulation circuit (21) for controlling a temperature (Tbat) of the battery (120) to a temperature within a predetermined battery temperature range (Wbat).

The engine heat exchanging system (50) performs an engine heat exchanging for exchanging heat between the cooling medium flowing in the engine circulation circuit (11) and the cooling medium flowing in the battery circulation circuit (21).

The electronic control unit (90) controls a flow of the cooling medium and an activation of the engine heat exchanging system (50).

The electronic control unit (90) is configured to control the flow of the cooling medium so as to flow the cooling medium in the engine circulation circuit (11) and the battery circulation circuit (21) and the activation of the engine heat exchanging system (50) so as to perform the engine heat exchanging (see a routine shown in FIG. 10) when the temperature (Teng) of the internal combustion engine (110) is equal to or higher than an engine warming end temperature (Teng_dan), and the temperature (Tbat) of the battery (120) is lower than a battery warming end temperature (Tbat_dan) (see a determination "Yes" at a step 910 in FIG. 9).

The electronic control unit (90) is further configured to control the flow of the cooling medium so as to flow the cooling medium in the engine circulation circuit (11) and the battery circulation circuit (21) and the activation of the engine heat exchanging, system (50) so as not to perform the engine heat exchanging (see processes of steps 1040 to 1050 in FIG. 10) when the temperature (Teng) of the internal combustion engine (110) is lower than the engine warming end temperature (Teng_dan), and the temperature (Tbat) of the battery (120) is lower than a predetermined battery temperature (Tbat_th) lower than the battery warming end temperature (Tbat_dan) (see a determination "No" at a step 1005 in FIG. 10).

The electronic control unit (90) is further configured to control the flow of the cooling medium so as to flow the cooling medium in the engine circulation circuit (11) and the battery circulation circuit (21) and the activation of the engine heat exchanging system (50) so as to perform the engine heat exchanging (see processes of steps 1010 to 1020 in FIG. 10) when the temperature (Teng) of the internal combustion engine (110) is lower than the engine warming end temperature (Teng_dan), and the temperature (Tbat) of the battery (120) is equal to or higher than the predetermined battery temperature (Tbat_th) (see a determination "Yes" at the step 1005 in FIG. 10).

Thereby, the engine heat exchanging is not performed while the temperature of the internal combustion engine is lower than the engine warming end temperature, and the temperature of the battery is lower than the predetermined battery temperature lower than the battery warming end temperature. Thus, the heat of the cooling medium having a high temperature increased in the passage provided in the internal combustion engine, is not supplied to the cooling medium flowing through the passage provided in the battery. Therefore, the temperature of the internal combustion engine increases toward the engine warming end temperature at a large increasing rate. Thus, an amount of emission included in exhaust gas discharged from the internal combustion engine is maintained at a small amount.

When the temperature of the battery reaches the predetermined battery temperature, the engine heat exchanging is performed. Thereby, the heat of the cooling medium having the high temperature increased in the passage provided in the internal combustion engine, is supplied to, the cooling medium flowing through the passage provided in the battery. Thus, the increasing rate of the temperature of the internal combustion engine decreases. In this regard, the temperature of the internal combustion engine already reaches a relatively high temperature when the temperature of the battery reaches the predetermined battery temperature. Therefore, after the temperature of the battery reaches the predetermined battery temperature, the amount of the emission included in the exhaust gas discharged from the internal combustion engine is maintained at the small amount.

In addition, the heat of the cooling medium having the high temperature increased in the passage provided in the internal combustion engine, is not supplied to the cooling medium flowing through the passage provided in the battery until the temperature of the battery reaches the predetermined battery temperature. Therefore, the temperature of the battery is increased by heat generated by the battery until the temperature of the battery reaches the predetermined battery temperature. After the temperature of the battery reaches the predetermined battery temperature, the heat of the cooling medium having the high temperature increased in the passage provided in the internal combustion engine, is supplied to the cooling medium flowing through the passage provided in the battery. Thus, the temperature of the battery increases at the large increasing rate. Therefore, the temperature of the battery reaches the battery warming end temperature promptly.

Accordingly, as a whole, the amount of the emission included in the exhaust gas discharged from the internal combustion engine can be maintained at the small amount, and the temperature of the battery can reach the battery warming end temperature promptly.

According to an aspect of the invention, the engine heat exchanging system (50) may include a first engine connection passage (61, 62), a second engine connection passage (71, 72), and an engine connection control valve (65, 75).

The first engine connection passage (61, 62) connects the engine circulation circuit (11) and the battery circulation circuit (21) to each other so as to supply the cooling medium from the engine circulation circuit (11) to the battery circulation circuit (21). The second engine connection passage (71, 72) connects the engine circulation circuit (11) and the battery circulation circuit (21) to each other so as to discharge the cooling medium from the battery circulation circuit (21) to the engine circulation circuit (11).

The engine connection control valve (65, 75) controls a connection between the engine circulation circuit (11) and the battery circulation circuit (21).

In this aspect, the electronic control unit (90) may be configured to control the activation of the engine heat exchanging system (50) so as not to perform the engine heat exchanging by controlling an activation of the engine connection control valve (65, 75) so as to shut off any of a communication between the engine circulation circuit (11) and the battery circulation circuit (21) via the first engine connection passage (61, 62) and a communication between the engine circulation circuit (11) and the battery circulation circuit (21) via the second engine connection passage (71, 72) (see the process of the step 1040 in FIG. 10).

In this case, the electronic control unit (90) may be further configured to control the activation of the engine heat exchanging system (50) so as to perform the engine heat exchanging by controlling the activation of the engine connection control valve (65, 75) so as to communicate the engine circulation circuit (11) and the battery circulation circuit (21) with each other via the first engine connection passage (61, 62) and the second engine connection passage (71, 72) (see the process of the step 1010 in FIG. 10).

Thereby, after the temperature of the battery reaches the predetermined battery temperature, the heat of the cooling medium having the high temperature increased in the passage provided in the internal combustion engine, is supplied to the cooling medium flowing through the passage provided in the battery. Thus, the heat of the cooling medium having the high temperature increased in the passage provided in the internal combustion engine, can be supplied efficiently to the cooling medium flowing through the passage provided in the battery.

According to another aspect of the invention, the electronic control unit (90) may be configured to control a flow rate (Reng) of the cooling medium flowing in the engine circulation circuit (11) to a minimum flow rate (Reng_min) (see the process of the step 1050 in FIG. 10) when the temperature (Teng) of the internal combustion engine (110) is lower than the engine warming end temperature (Teng_dan), and the temperature (Tbat) of the battery (120) is lower than the predetermined battery temperature (Tbat_th) (see the determinations "Yes" at the step 910 in FIG. 9 and the step 1005 in FIG. 10).

Thereby, even when the cooling medium flows in the engine circulation circuit until the temperature of the battery reaches the predetermined battery temperature, the flow rate of the cooling medium flowing in the engine circulation circuit is maintained at the minimum flow rate. Therefore, an ability of the cooling medium to cool the internal combustion engine is small. Thus, the temperature of the internal combustion engine can increase at the large increasing rate.

According to further another aspect of the invention, the first cooling system (12) may include a radiator provided in the engine circulation circuit (11). Thereby, the cooling medium flowing in the engine circulation circuit can be cooled by the radiator which is used in the known vehicles.

According to further another aspect of the invention, the second cooling system (40) may include a heat pump having an evaporator (41) provided in the battery circulation circuit (21), a condenser (42), a compressor (43), and an expansion valve (44).

Thereby, the cooling medium flowing in the battery circulation circuit can be cooled by the evaporator of the heat pump. In general, an ability of the heat pump to cool the cooling medium is larger than an ability of the radiator to cool the cooling medium used in the known vehicles. Thus, the temperature of the battery can be surely controlled to the temperature within the predetermined battery temperature range.

According to further another aspect of the invention, the vehicle may comprise a device (180) including an electric motor. In this case, the temperature control apparatus may further comprise a device circulation circuit (31) and a device heat exchanging system (50).

In this case, the device circulation circuit (31) includes a passage (35) provided in the device (180) and a passage (36) provided in a third cooling system (32). The cooling medium flows in the device circulation circuit (31) for controlling a temperature (Tdev) of the device (180) to a temperature within a predetermined device temperature range (Wdev).

The device heat exchanging system (50) performs a device heat exchanging for exchanging the heat between the cooling medium flowing in the device circulation circuit (31) and the cooling medium flowing in the battery circulation circuit (21).

In this aspect, the electronic control unit (90) may be configured to control the flow of the cooling medium so as to flow the cooling medium in the engine circulation circuit (11), the device circulation circuit (31), and the battery circulation circuit (21), control the activation of the engine heat exchanging system (50) so as not to perform the engine heat exchanging, and control the activation of the device heat exchanging system (50) so as to perform the device heat exchanging (see the processes, of the steps 1040 to 1050 in FIG. 10) when the temperature (Teng) of the internal combustion engine (110) is lower than the engine warming, end temperature (Teng_dan), and the temperature (Tbat) is lower than the predetermined temperature (see the determination "No" at the step 1005 in FIG. 10).

In this case, the electronic control unit (90) may be further configured to control the flow of the cooling medium so as to flow the cooling medium in the engine circulation circuit (11) and the battery circulation circuit (21) and control the activation of the engine heat exchanging system (50) so as to perform the engine heat exchanging (see the processes of the steps 1010 to 1020 in FIG. 10) when the temperature (Tbat) of the battery (120) reaches the predetermined battery temperature (Tbat_th) while the temperature (Teng) of the internal combustion engine (110) is lower than the engine warming end temperature (Teng_dan) (see the determination "Yes" at the step 1005 in FIG. 10).

Thereby, the device heat exchanging is performed while the temperature of the internal combustion engine is lower than the engine warming end temperature, and the temperature of the battery is lower than the predetermined battery temperature lower than the battery warming end temperature. Therefore, the temperature of the battery can increase to the predetermined battery temperature promptly. Thus, the temperature of the battery can increase to the battery warming end temperature promptly.

According to further another aspect of the invention, the device heat exchanging system (50) may include a first device connection passage (62, 63), a second device connection passage (72, 73), and a device connection control valve (65, 75). The first device connection passage (62, 63) connects the device circulation circuit (31) and the battery circulation circuit (21) to each other so as to supply the cooling medium from the device circulation circuit (31) to the battery circulation circuit (21). The second device connection passage (72, 73) connects the device circulation circuit (31) and the battery circulation circuit (21) to each other so as to discharge the cooling medium from the battery circulation circuit (21) to the device circulation circuit (31). The device connection control valve (65, 75) controls a connection between the device circulation circuit (31) and the battery circulation circuit (21).

In this aspect, the electronic control unit (90) may be configured to control the activation of the device heat exchanging system (50) so as not to perform the device heat exchanging by controlling the activation of the device connection control valve (65, 75) so as to communicate the device circulation circuit (31) and the battery circulation circuit (21) with each other via the first device connection passage (62, 63) and the second device connection passage (72, 73) (see the process of the step 1040 in FIG. 10).

Thereby, the cooling medium having the relatively high temperature increased in the passage provided in the device, is supplied to the passage provided in the battery until the temperature of the battery reaches the predetermined battery temperature. Thus, the heat of the cooling medium having the relatively high temperature increased in the passage provided in the device, can be supplied efficiently to the cooling medium flowing through the passage provided in the battery.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
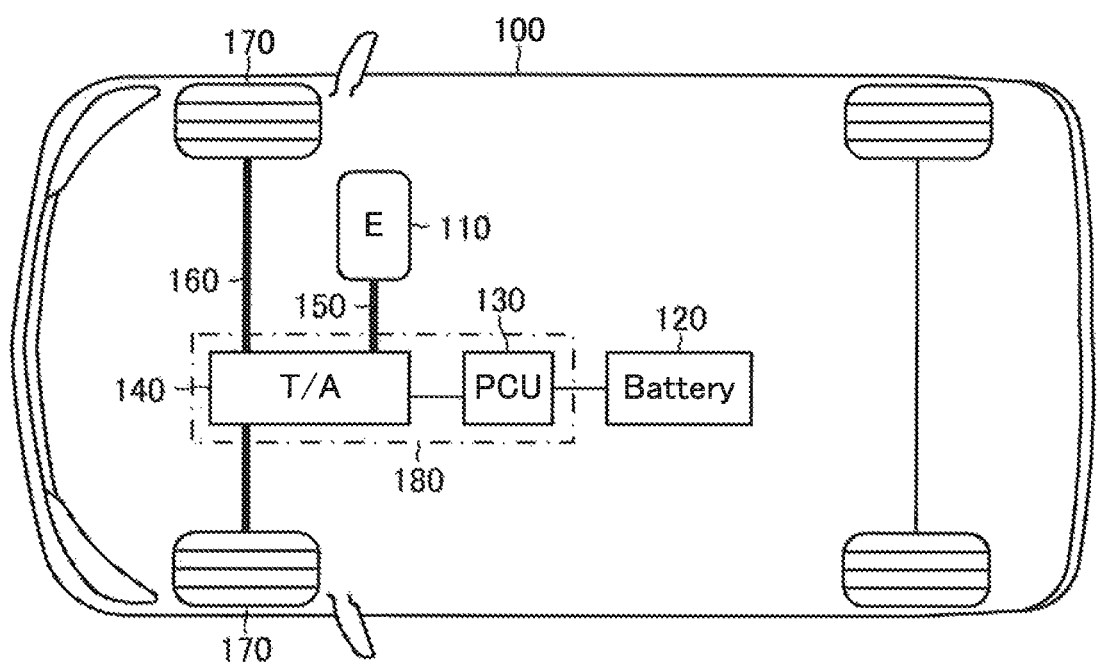
FIG. 1 is a view for showing a vehicle, to which a temperature control apparatus according to an embodiment of the invention is applied.

Below, a temperature control apparatus of a vehicle according to an embodiment of the invention will be described with reference to the drawings. Hereinafter, the temperature control apparatus of the vehicle according to the embodiment will be referred to as "the embodiment apparatus". The embodiment apparatus is applied to a vehicle 100 shown in FIG. 1. An internal combustion engine 110, a rechargeable battery 120, a power control unit 130, and a transaxle 140 are mounted on the vehicle 100.

The power control unit 130 includes an inverter, a boost converter, a DC/DC converter, and the like. The transaxle 140 includes a first motor generator, a second motor generator, and a driving force distribution mechanism. The driving force distribution mechanism is, for example, a planetary gear mechanism. Hereinafter, the power control unit 130 will be referred to as "the PCU 130".

The vehicle 100 is a so-called hybrid vehicle which is driven by power output from the internal combustion engine 110, the first motor generator, and the second motor generator.

The engine 110 outputs a torque (hereinafter, will be referred to, as "engine torque") to the driving force distribution mechanism through an output shaft 150. The driving force distribution mechanism distributes the engine torque into a torque for rotating an output shaft of the driving force distribution mechanism and a torque for driving the first motor generator as an electric generator at a predetermined distribution proportion (a predetermined distribution property).

The driving force distribution mechanism transmits the engine torque and a torque input into the driving force distribution mechanism from the second motor generator to right and left driving wheels 170 through a wheel driving shaft 160. The driving force distribution mechanism is known, for example in JP 2013-77026 A, etc.

The first and second motor generators are permanent magnet synchronous motors, respectively. The first and second motor generators are electrically connected to the battery 120 via the inverter of the PCU 130.

The first motor generator is mainly used as an electric generator. When the first motor generator is used as the electric generator, a rotation shaft of the first motor generator is rotated by external forces such as a moving energy of the vehicle 100 and the engine torque, thereby generating electric power. The generated electric power is charged in the battery 120 via the inverter of the PCU 130. The first motor generator is also used as an electric motor. When the first motor generator is used as the electric motor, the first motor generator is driven by the electric power supplied thereto from the battery 120 via the inverter of the PCU 130.

The second motor generator is mainly used as an electric motor. When the second motor generator is used as the electric motor, the second motor generator is activated by the electric power supplied thereto from the battery 120 via the inverter of the PCU 130. The second motor generator is also used as an electric generator. When the second motor generator is used as the electric generator, a rotation shaft of the second motor generator is rotated by the external forces such as the moving energy of the vehicle 100 and the engine torque, thereby generating electric power. The generated electric power is charged in the battery 120 via the inverter of the PCU 130.

Figure 2:
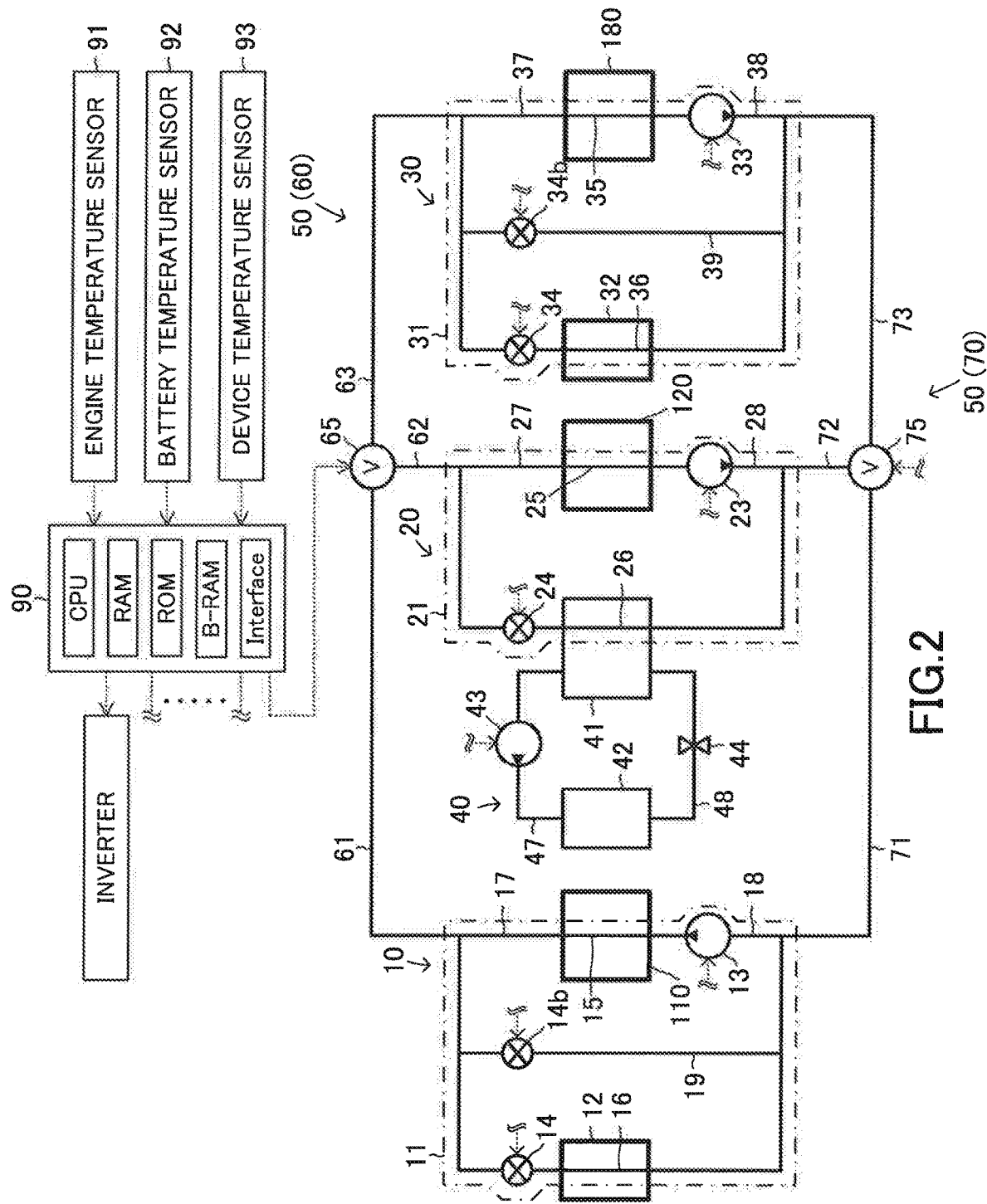
FIG. 2 is a view for showing the temperature control apparatus according to the embodiment.

As shown in FIG. 2, the inverter of the PCU 130 is electrically connected to, an ECU 90. The ECU 90 is an electronic control unit or an electronic control circuit including as a main component a microcomputer including a CPU, a ROM, a RAM, an interface and the like. The CPU realizes various functions described later by executing instructions or routines stored in a memory, i.e., the ROM.

An activation of the inverter of the PCU 130 is controlled by the ECU 90. The ECU 90 controls activations of the first motor generator and the second motor generator by controlling the activation of the inverter.

As shown in FIG. 2, the embodiment apparatus includes an engine temperature control system 10, a battery temperature control system 20, a device temperature control system 30, and a heat exchanging system 50.

<Engine Temperature Control System>

The engine temperature control system 10 includes an engine circulation circuit 11, an engine radiator 12, an engine pump 13, an engine shut-off valve 14, and an engine bypass shut-off valve 14b.

When the engine 110 operates, the engine 110 generates heat. The engine 110 operates optimally when a temperature Teng of the engine 110 is maintained at a temperature within a predetermined engine temperature range Weng higher than zero Celsius. The engine circulation circuit 11 is a passage, through which a cooling medium such as a cooling water and a cooling liquid flows to control the temperature Teng of the engine 110 at the temperature within the predetermined engine temperature range Weng. Hereinafter, the temperature Teng will be referred to as "the engine temperature Teng".

Below, the embodiment apparatus will be described, using a so-called cooling water as the cooling medium which flows in the engine circulation circuit 11, circulation circuits described later, and the like. The cooling medium may be a liquid which can exchange heat (that is, a heat exchanging liquid).

The engine circulation circuit 11 informed by an engine passage 15, an engine radiator passage 16, a first engine circulation passage 17, a second engine circulation passage 18, and an engine bypass passage 19. The engine passage 15 is a passage formed in the engine 110. The engine radiator passage 16 is a passage formed in the engine radiator 12. The first engine circulation passage 17 is a passage which connects an outlet of the engine passage 15 to an inlet of the engine radiator passage 16. The second engine circulation passage 18 is a passage which connects an outlet of the engine radiator passage 16 to an inlet of the engine passage 15. The engine bypass passage 19 is a passage which connects the first engine circulation passage 17 and the second engine circulation passage 18 to each other.

The engine shut-off valve 14 is provided in the first engine circulation passage 17 between a portion of the first engine circulation passage 17, to which a first connection passage 61 described later is connected, and the engine radiator 12.

When the engine shut-off valve 14 is set at an open position, the first engine circulation passage 17 is open. Therefore, the cooling water flowing out from the engine passage 15 flows into the engine radiator passage 16 through the first engine circulation passage 17. When the engine shut-off valve 14 is set at a closed position, the first engine circulation passage 17 is shut off. Therefore, the cooling water flowing out from the engine passage 15 cannot flow into the engine radiator passage 16 through the first engine circulation passage 17.

The engine pump 13 is provided in the second engine circulation passage 18 between a portion of the second engine circulation passage 18, to which a first connection passage 71 described later is connected, and the engine 110.

The engine bypass shut-off valve 14b is provided in the engine bypass passage 19.

When the engine bypass shut-off valve 14b is set at an open position, the engine bypass passage 19 is open. Therefore, the cooling water flowing through the first engine circulation passage 17 flows into the second engine circulation passage 18 through the engine bypass passage 19. While the cooling water flows through the engine bypass passage 19, the cooling water cannot flow through the engine radiator passage 16. When the engine bypass shut-off valve 14b is set at a closed position, the engine bypass passage 19 is shut off. Therefore, the cooling water cannot flow from the first engine circulation passage 17 to the second engine circulation passage 18 through the engine bypass passage 19.

<Battery Temperature Control System>

The battery temperature control system 20 includes a battery circulation circuit 21, a heat pump 40, a battery pump 23, and a battery shut-off valve 24.

When the electric power is supplied to the first and second motor generators from the battery 120, the battery 120 generates heat. The battery 120 supplies the electric power to the first and second motor generators efficiently when a temperature Tbat of the battery 120 is maintained at a temperature within a predetermined battery temperature range Wbat higher than zero Celsius. The battery circulation circuit 21 is a passage, through which the cooling water flows to control the temperature Tbat of the battery 120 at the temperature within the predetermined battery temperature range Wbat. Hereinafter, the temperature Tbat of the battery 120 will be referred to as "the battery temperature Tbat".

The battery circulation circuit 21 is formed by a battery passage 25, an evaporator passage 26, a first battery circulation passage 27, and a second battery circulation passage 28. The battery passage 25 is formed in the battery 120. The evaporator passage 26 is formed in an evaporator 41 of the heat pump 40. The first battery circulation passage 27 connects an outlet of the evaporator passage 26 to an inlet of the battery passage 25. The second battery circulation passage 28 connects an outlet of the battery passage 25 to an inlet of the evaporator passage 26.

The battery shut-off valve 24 is provided in the first battery circulation passage 27 between a portion of the first battery circulation passage 27, to which a second connection passage 62 described later is connected, and the evaporator 41.

When the battery shut-off valve 24 is set at an open position, the first battery circulation passage 27 is open. Therefore, the cooling water flowing out from the evaporator passage 26 flows into the battery passage 25 through the first battery circulation passage 27. When the battery shut-off valve 24 is set at a closed position, the first battery circulation passage 27 is shut off. Therefore, the cooling water cannot flow into the battery passage 25 from the evaporator passage 26 through the first battery circulation passage 27.

The battery pump 23 is provided in the second battery circulation passage 28 between a portion of the second battery circulation passage 28, to which a second connection passage 72 described later is connected, and the battery 120.

<Heat Pump>

The heat pump 40 includes an evaporator 41, a condenser 42, a compressor 43, and an expansion valve 44. Further, the heat pump 40 includes a first heat pump passage 47 and a second heat pump passage 48. The first heat pump passage 47 connects a heat medium outlet of the evaporator 41 to a heat medium inlet of the condenser 42. The second heat pump passage 48 connects a heat medium outlet of the condenser 42 to a heat medium inlet of the evaporator 41.

The compressor 43 is provided in the first heat pump passage 47.

The expansion valve 44 is provided in the second heat pump passage 48.

<Device Temperature Control System>

The device temperature control system 30 includes a device circulation circuit 31, a device radiator 32, a device pump 33, a device shut-off valve 34, and a device bypass shut-off valve 34b.

When a hybrid device 180 including the PCU 130 and the transaxle 140 activates, the hybrid device 180 generates heat. The device 180 activates optimally when a temperature Tdev of the hybrid device 180 is maintained at a temperature within a predetermined device temperature range Wdev higher than zero Celsius. The device circulation circuit 31 is a passage, through which the cooling water flows to control the temperature Tdev of the hybrid device 180 at the temperature within the predetermined device temperature range Wdev. Hereinafter, the temperature Tdev of the hybrid device 180 will be referred to as "the device temperature Tdev".

The device circulation circuit 31 is formed by a device passage 35, a device radiator passage 36, a first device circulation passage 37, a second device circulation passage 38, and a device bypass passage 39. The device passage 35 is a passage formed in the hybrid device 180. The device radiator passage 36 is a passage formed in the device radiator 32. The first device circulation passage 37 is a passage which connects an outlet of the device radiator passage 36 to an inlet of the device passage 35. The second device circulation passage 38 is a passage which connects an outlet of the device passage 35 to an inlet of the device radiator passage 36. The device bypass passage 39 connects the first device circulation passage 37 and the second device circulation passage 38 to each other.

The device shut-off valve 34 is provided in the first device circulation passage 37 between a portion of the first device circulation passage 37, to which a third connection passage 63 described later is connected, and the device radiator 32.

When the device shut-off valve 34 is set at an open position, the first device circulation passage 37 is open. Therefore, the cooling water flowing, out from the device radiator passage 36 flows into the device passage 35 through the first device circulation passage 37. When the device shut-off valve 34 is set at a closed position, the first device circulation passage 37 is shut off. Therefore, the cooling water cannot flow into the device passage 35 from the device radiator passage 36 through the first device circulation passage 37.

The device pump 33 is provided in the second device circulation passage 38 between a portion of the second device circulation passage 38, to which a third connection passage 73 described later is connected, and the hybrid device 180.

The device bypass shut-off valve 34b is provided in the device bypass, passage 39.

When the device bypass shut-off valve 34b is set at an open position, the device bypass passage 39 is open. Therefore, the cooling water flowing through the second device circulation passage 38 flows into the first device circulation passage 37 through the device bypass passage 39. While the cooling water flows through the device bypass passage 39, the cooling water cannot flow through the device radiator passage 36. When the device bypass shut-off valve 34b is set at a closed position, the device bypass passage 39 is shut off. Therefore, the cooling water cannot flow into the first device circulation passage 37 from the second device circulation passage 38 through the device bypass passage 39.

<Heat Exchanging System>

The heat exchanging system 50 includes a first connection circuit 60, a first control valve 65, a second connection circuit 70, and a second control valve 75.

<First Connection Circuit>

The first connection circuit 60 is a passage for communicating the cooling water among the engine circulation circuit 11, the battery circulation circuit 21, and the device circulation circuit 31.

The first connection circuit 60 is formed by a first connection passage 61, a second connection passage 62, a third connection passage 63, and an interior passage of the first control valve 65.

One end of the first connection passage 61 is connected to the first engine circulation passage 17. The other end of the first connection passage 61 is connected to the interior passage of the first control valve 65.

One end of the second connection passage 62 is connected to the first battery circulation passage 27. The other end of the second connection passage 62 is connected to the interior passage of the first control valve 65.

One end of the third connection passage 63 is connected to the first device circulation passage 37. The other end of the third connection passage 63 is connected to the interior passage of the first control valve 65.

When the first control valve 65 is set at a first connection position, the first engine circulation passage 17 communicates with the first battery circulation passage 27 via the first connection passage 61, the interior passage of the first control valve 65, and the second connection passage 62.

When the first control valve 65 is set at a second connection position, the first device circulation passage 37 communicates with the first battery circulation passage 27 via the third connection passage 63, the interior passage of the first control valve 65, and the second connection passage 62.

When the first control valve 65 is set at a shut-off position, a communication among the first engine circulation passage 17, the first battery circulation passage 27, and the first device circulation passage 37 is shut off.

<Second Connection Circuit>

The second connection circuit 70 is a passage for communicating the cooling water among the battery circulation circuit 21, the device circulation circuit 31, and the engine circulation circuit 11.

The second connection circuit 70 is formed by a first connection passage 71, a second connection passage 72, a third connection passage 73, and an interior passage of the second control valve 75.

One end of the first connection passage 71 is connected to the second engine circulation passage 18. The other end of the first connection passage 71 is connected to the interior passage of the second control valve 75.

One end of the second connection passage 72 is connected to the second battery circulation passage 28. The other end of the second connection passage 72 is connected to the interior passage of the second control valve 75.

One end of the third connection passage 73 is connected to the second device circulation passage 38. The other end of the third connection passage 73 is connected to the interior passage of the second control valve 75.

When the second control valve 75 is set at a first connection position, the second battery circulation passage 28 communicates with the second engine circulation passage 18 via the second connection passage 72, the interior passage of the second control valve 75, and the first connection passage 71.

When the second control valve 75 is set at a second connection position, the second device circulation passage 38 communicates with the second battery circulation passage 28 via the third connection passage 73, the interior passage of the second control valve 75, and the second connection passage 72.

When the second control valve 75 is set at a shut-off position, a communication among the second engine circulation passage 18, the second battery circulation passage 28, and the second device circulation passage 38 is shut off.

<Sensors>

An engine temperature sensor 91 is provided in the first engine circulation passage 17 between the outlet of the engine passage 15 and the portion of the first engine circulation passage 17, to which the first connection passage 71 is, connected. The engine temperature sensor 91 is electrically connected to the ECU 90. The engine temperature sensor 91 detects a temperature of the cooling water flowing through the first engine circulation passage 17 and outputs a signal representing the detected temperature to the ECU 90. The ECU 90 acquires the temperature of the cooling water flowing through the first engine circulation passage 17 as the engine temperature Teng on the basis of the signal of the engine temperature sensor 91.

A battery temperature sensor 92 is provided in the second battery circulation passage 28 between the outlet of the battery passage 25 and the portion of the second battery circulation passage 28, to which the second connection passage 72 is connected. The battery temperature sensor 92 is electrically connected to the ECU 90. The battery temperature sensor 92 detects a temperature of the cooling water flowing through the second battery circulation passage 28 and outputs a signal representing the detected temperature to the ECU 90. The ECU 90 acquires the temperature of the cooling water flowing through the second battery circulation passage 28 as the battery temperature Tbat on the basis of the signal of the battery temperature sensor 92.

A device temperature sensor 93 is provided in the second device circulation passage 38 between the outlet of the device passage 35 and the portion of the second device circulation passage 38, to which the third connection passage 73 is connected. The device temperature sensor 93 is electrically connected to the ECU 90. The device temperature sensor 93 detects a temperature of the cooling water flowing through the second device circulation passage 38 and outputs a signal representing the detected temperature to the ECU 90. The ECU 90 acquires the temperature of the cooling water flowing through the second device circulation passage 38 as the device temperature Tdev on the basis of the signal of the device temperature sensor 93.

<Summary of Operation of Embodiment Apparatus>

Next, a summary of an operation of the embodiment apparatus will be described,

<Engine Operation>

When the engine 110 is requested to operate, the embodiment apparatus starts an operation of the engine 110. On the other hand, when the engine 110 is not requested to operate, the embodiment apparatus stops the operation of the engine 110. Hereinafter, the operation of the engine 110 will be referred to as "the engine operation".

<First Motor Generator Activation>

As described above, the electric power stored in the battery 120 is consumed for activating, the first motor generator. The battery 120 supplies the electric power to the first motor generator efficiently when the battery temperature Tbat is maintained at the temperature within the predetermined battery temperature range Wbat.

Accordingly, the embodiment apparatus continues to stop activating the first motor generator when the first motor generator is requested to activate, and the battery temperature Tbat is lower than a lower limit temperature of the predetermined battery temperature range Wbat. When the battery temperature Tbat reaches a lower limit temperature of the predetermined battery temperature range Wbat, the embodiment apparatus starts to activate the first motor generator. On the other hand, when the first motor generator is not requested to activate, the embodiment apparatus stops activating the first motor generator, Hereinafter, the lower limit temperature of the predetermined battery temperature range Wbat will be referred to as "the battery warming end temperature Tbat_dan".

<Second Motor Generator Activation>

As described above, the electric power stored in the battery 120 is consumed for activating the second motor generator. The battery 120 supplies the electric power to the second motor generator efficiently when the battery temperature Tbat is maintained at the temperature within the predetermined battery temperature range Wbat.

Accordingly, the embodiment apparatus continues to stop activating the second motor generator when the second motor generator is requested to activate, and the battery temperature Tbat is lower than the battery warming end temperature Tbat_dan. When the battery temperature Tbat reaches the battery warming end temperature Tbat_dan, the embodiment apparatus starts to activate the second motor generator. On the other hand, when the second motor generator is not requested to activate, the embodiment apparatus stops activating the second motor generator.

<Engine Warming Request>

As described above, the engine 110 operates optimally when the engine temperature Teng is maintained at the temperature within the predetermined engine temperature range Weng. Accordingly, the embodiment apparatus determines that a process for increasing the engine temperature Teng is requested to be executed when the engine temperature Teng is lower than a lower limit temperature of the predetermined engine temperature range Weng while the engine 110 is requested to operate and thus, the engine 110 operates. Hereinafter, the lower limit temperature of the predetermined engine temperature range Weng will be referred to, as "the engine warming end temperature Teng_dan".

On the other hand, when the engine temperature Teng is equal to or higher than the engine warming end temperature Teng_dan while the engine 110 is requested to operate, the embodiment apparatus determines that the process for increasing the engine temperature Teng is not requested to be executed, that is, a process for cooling the engine 110 is requested to be executed.

<Battery Warming Request>

Further, as described above, the battery 120 supplies the electric power to the first and second motor generators efficiently when the battery temperature Tbat is maintained at the temperature within the predetermined battery temperature range Wbat. Accordingly, the embodiment apparatus determines that a process for increasing the battery temperature Tbat is requested to be executed when the battery temperature Tbat is lower than the battery warming end temperature Tbat_dan while the first and second motor generators are requested to activate and thus, the electric power of the battery 120 is requested to be consumed.

On the other hand, when the battery temperature Tbat is equal to or higher than the battery warming end temperature Tbat_dan while the electric power of the battery 120 is requested to be consumed, the embodiment apparatus determines that the process for increasing the battery temperature Tbat is not requested to be executed, that is, a process for cooling the battery 120 is requested to be executed.

<Device Warming Request>

Further, as described above, the hybrid device 180 activates optimally when the device temperature Tdev is maintained at the temperature within the predetermined device temperature range Wdev. Accordingly, the embodiment apparatus determines that a process for increasing the device temperature Tdev is requested to be executed when the device temperature Tdev is lower than a lower limit temperature of the predetermined device temperature range Wdev while the electric power of the battery 120 is requested to be consumed. Hereinafter, the lower limit temperature of the predetermined device temperature range Wdev will be referred to as "the device warming end temperature Tdev_dan".

On the other hand, when the device temperature Tdev is equal to or higher than the device warming end temperature Tdev_dan while the electric power of the battery 120 is requested to be consumed, the embodiment apparatus determines that the process for increasing the device temperature Tdev is not requested to be executed, that is, a process for cooling the hybrid device 180 is requested to be executed.

In this embodiment, the battery warming end temperature Tbat_dan and the device warming end temperature Tdev_dan are lower than the engine warming end temperature Teng_dan.

<Battery Warming not Requested>

When the process for increasing the battery temperature Tbat is not requested to be executed, that is, the process for cooling the battery 120 is requested to be executed, the embodiment apparatus sets the first control valve 65 and the second control valve 75 at the shut-off positions, respectively. In addition, the embodiment apparatus sets the battery shut-off valve 24 at the open position and activates the compressor 43 and the battery pump 23. Thereby, the cooling water discharged from the battery pump 23 flows in the battery circulation circuit 21 as shown by arrows, in FIG. 3. In particular, the cooling water discharged from the battery pump 23 flows through the second battery circulation passage 28, the evaporator passage 26, the first battery circulation passage 27, the battery passage 25, and the second battery circulation passage 28 and flows into the battery pump 23.

In this case, the embodiment apparatus controls the activation of the battery pump 23 to control a flow rate Rbat of the cooling water discharged from the battery pump 23 to a target battery flow rate Rbat_tgt which is set, depending on the battery temperature Tbat. In particular, the embodiment apparatus controls the activation of the battery pump 23 such that the flow rate Rbat of the cooling water discharged from the battery pump 23 when the battery temperature Tbat is high, is larger than the flow rate Rbat of discharged from the battery pump 23 when the battery temperature Tbat is low. The target flow rate Rbat_tgt is set to a flow rate capable of maintaining the battery temperature Tbat at the temperature within the predetermined battery temperature range Wbat equal to or higher than the battery warming end temperature Tbat_dan.

Figure 3:
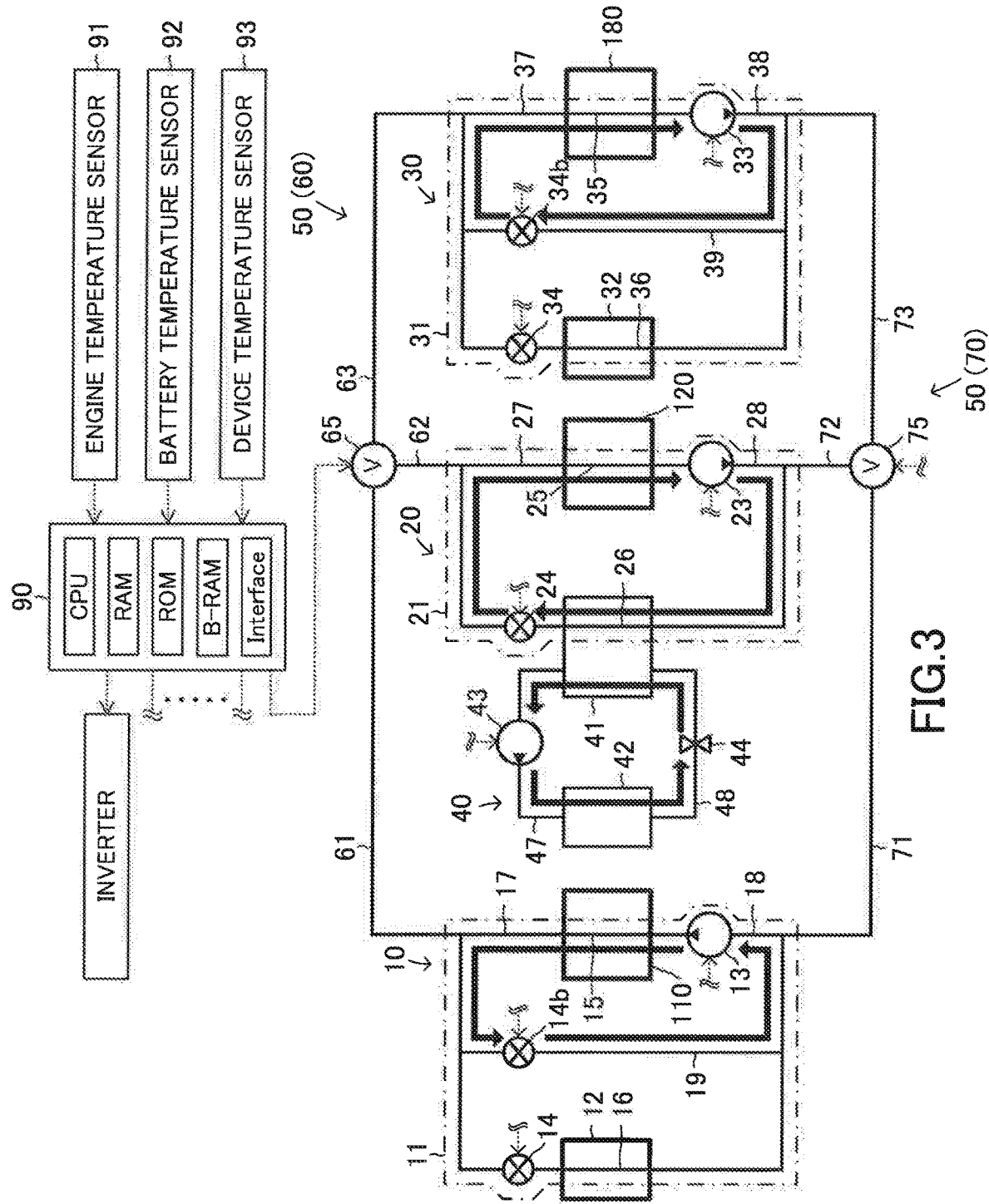
FIG. 3 is a view similar to FIG. 2 for showing flows of cooling water and heat medium.

The heat medium discharged from the compressor 43 flows through the first heat pump passage 47, the condenser 42, the second heat pump passage 48, the condenser 42, the second heat pump passage 48, the evaporator 41, and the first heat pump passage 47 and flows into the compressor 43 as shown by the arrows in FIG. 3.

The heat medium is, compressed by the compressor 43. Thus, a pressure and a temperature of the heat medium increase to a high pressure and a high temperature, respectively. The heat medium having, the high pressure and the high temperature discharges its heat to the outside air while the heat medium flows through the condenser 42. Thus, the temperature of the heat medium decreases to a low temperature. On the other hand, the pressure of the heat medium is still high. The heat medium having the high pressure and the low temperature expands while the heat medium flows through the expansion valve 44 provided in the second heat pump passage 48. Thus, the pressure of the heat medium decreases to a low pressure, and the temperature of the heat medium is low. The heat medium having the low pressure and the low temperature absorbs the heat of the cooling water flowing through the evaporator passage 26 while the heat medium flows through the evaporator 41. Thus, the heat medium cools the cooling water.

As described above, the cooling water flowing in the battery circulation circuit 21 is cooled by the evaporator 41 while the cooling water flows through the evaporator passage 26. The cooled cooling water is supplied to the battery passage 25. At this time, the temperature of the cooling water flowing into the evaporator passage 26 is relatively high and the flow rate of the cooling water flowing through the evaporator passage 26 is relatively large. Thus, the cooling water is cooled in the evaporator 41 to a large extent. Therefore, the battery 120 is cooled by the cooling water supplied to the battery passage 25. In addition, the flow rate Rbat of the cooling water discharged from the battery pump 23 is controlled to the flow rate capable of maintaining the battery temperature Tbat at the temperature within the predetermined battery temperature range Wbat (that is, the target battery flow rate Rbat_tgt). Thus, the battery temperature Tbat can be maintained at the temperature within the predetermined battery temperature range Wbat.

<Battery Warming not Requested and Engine Warming Requested>

When the battery 120 is not requested to be warmed, and the engine 110 is requested to be warmed, the embodiment apparatus sets the engine shut-off valve 14 at the closed position, sets the engine bypass shut-off valve 14b at the open position, and activates the engine pump 13.

Thereby, the cooling water discharged from the engine pump 13 flows in the engine circulation circuit 11 as shown by the arrows in FIG. 3. In particular, the cooling water discharged from the engine pump 13 flows through the second engine circulation passage 18, the engine passage 15, the first engine circulation passage 17, the engine bypass passage 19, and the second engine circulation passage 18 and flows into the engine pump 13.

In addition, the embodiment apparatus controls the activation of the engine pump 13 so as to control a flow rate Reng of the cooling water discharged from the engine pump 13 to a minimum flow rate Reng_min.

Thereby, the cooling water having the minimum flow rate Reng_min is supplied to the engine passage 15 without flowing through the engine radiator passage 16. Thus, the engine temperature Teng increases toward the engine warming end temperature Teng_dan.

In this embodiment, the minimum flow rate Reng_min is set to a flow rate larger than zero. However, the minimum flow rate Reng_min may be set to zero.

<Battery Warming not Requested and Engine Warming not Requested>

When the battery 120 is not requested to be warmed, and the engine 110 is not requested to be warmed, that is, the engine 110 is requested to be cooled, the embodiment apparatus sets the engine shut-off valve 14 at the open position, sets the engine bypass shut-off valve 14b at the closed position, and activates the engine pump 13.

Figure 4:
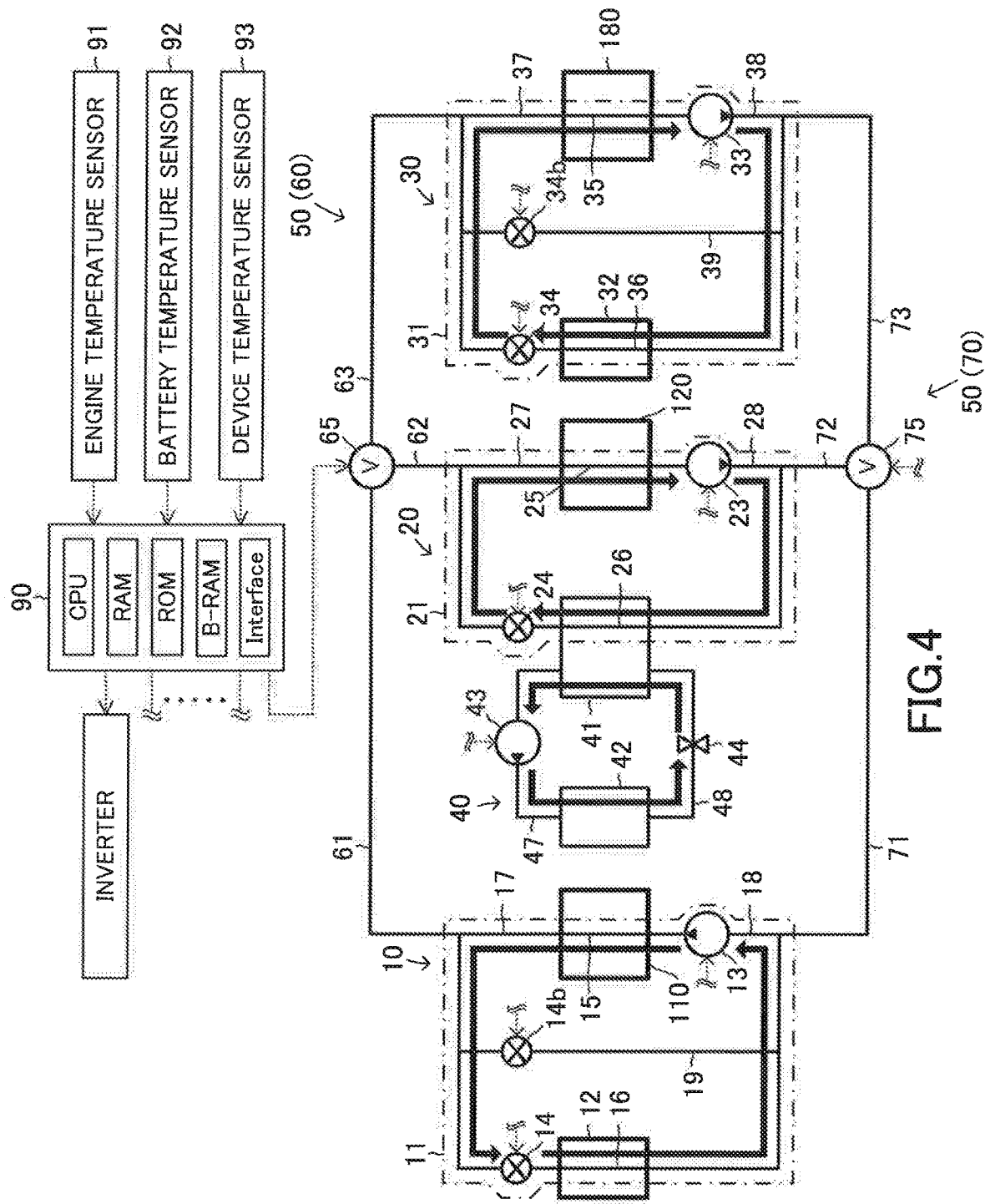
FIG. 4 is a view similar to FIG. 2 for showing the flows of the cooling water and the heat medium.

Thereby, the cooling water discharged from the engine pump 13 flows in the engine circulation circuit 11 as shown by arrows in FIG. 4. In particular, the cooling water discharged from the engine pump 13 flows through the second engine circulation passage 18, the engine passage 15, the first engine circulation passage 17, the engine radiator passage 16, and the second engine circulation passage 18 and flows into the engine pump 13.

In this case, the embodiment apparatus controls the activation of the engine pump 13 so as to control the flow rate Reng of the cooling water discharged from the engine pump 13 to a flow rate, depending on the engine temperature Teng. Hereinafter, the flow rate, depending on the engine temperature Teng will be referred to as "the target flow rate Reng_tgt". The target flow rate Reng_tgt is set as a flow rate capable of maintaining the engine temperature Teng at the temperature within the predetermined engine temperature range Weng equal to or higher than the engine warming end temperature Teng_dan. Therefore, the embodiment apparatus controls the activation of the engine pump 13 so as to cause the flow rate Reng of the cooling water discharged from the engine pump 13 when the engine temperature Teng is high to be larger than the flow rate Reng of the cooling water discharged from the engine pump 13 when the engine temperature Teng is low.

Thereby, the cooling water flowing in the engine circulation circuit 11 is cooled in the engine radiator passage 16 by the engine radiator 12. The cooled cooling water is supplied to the engine passage 15. In this case, the temperature of the cooling water flowing into the engine radiator passage 16 is relatively high, and the flow rate of the cooling water flowing through the engine radiator passage 16 is relatively large. Thus, the cooling water is cooled by the engine radiator 12 to a large extent. Therefore, the engine 110 is cooled by the cooling water supplied to the engine passage 15. In addition, the flow rate Reng of the cooling water discharged from the engine pump 13 is controlled to a flow rate (that is, the target flow rate Reng_tgt) capable of maintaining the engine temperature Teng to the temperature within the predetermined engine temperature range Weng. Thus, the engine temperature Teng is maintained at the temperature within the predetermined engine temperature range Weng.

<Battery Warming not Requested and Device Warming Requested>

When the battery 120 is not requested to be warmed, and the hybrid device 180 is requested to be, warmed, the embodiment apparatus sets the device shut-off valve 34 at the closes position, sets the device bypass shut-off valve 34b at the open position, and activates the device pump 33.

Thereby, the cooling water discharged from the device pump 33 flows through the device circulation circuit 31 as shown by the arrows in FIG. 3. In particular, the cooling water discharged from the device pump 33 flows through the second device circulation passage 38, the device bypass passage 39, the first device circulation passage 37, the device passage 35, and the second device circulation passage 38 and flows into the device pump 33.

In addition, the embodiment apparatus controls the activation of the device pump 33 so as to control a flow rate Rdev of the cooling water discharged from the device pump 33 to a minimum flow rate Rdev_min.

Thereby, the cooling water having the minimum flow rate Rdev_min is supplied to the device passage 35 without flowing through the device radiator passage 36 provided in the device radiator 32. Thus, the device temperature Tdev increases toward the device warming end temperature Tdev_dan.

In this embodiment, the minimum flow rate Rdev_min is set to a flow rate larger than zero. However, the minimum flow rate Rdev_min may be set to zero.

<Battery Warming not Requested and Device Warming not Requested.>

When the battery 120 is not requested to be warmed, and the hybrid device 180 is not requested to be warmed, that is, the hybrid device 180 is requested to be cooled, the embodiment apparatus sets the device shut-off valve 34 at the open position, sets the device bypass shut-off valve 34b at the closed position, and activates the device pump 33.

Thereby, the cooling water discharged from the device pump 33 flows through the device circulation circuit 31 as shown by the arrows in FIG. 4. In particular, the cooling water discharged from the device pump 33 flows through the second device circulation passage 38, the device radiator passage 36, the first device circulation passage 37, the device passage 35, and the second device circulation passage 38 and flows into the device pump 33.

In addition, the embodiment apparatus controls the activation of the device pump 33 so as to control the flow rate Rdev of the cooling water discharged from the device pump 33 to a flow rate, depending on the device temperature Tdev. Hereinafter, the flow rate, depending on the device temperature Tdev will be referred to as "the target flow rate Rdev_tgt". In particular, the embodiment apparatus controls the activation of the device pump 33 so as to cause the flow rate Rdev of the cooling water discharged from the device pump 33 when the device temperature Tdev is high to be larger than the flow rate Rdev of the cooling water discharged from the device pump 33 when the device temperature Tdev is low. The target flow rate Rdev_tgt is, set to a flow rate capable of maintaining the device temperature Tdev at the temperature within the predetermined device temperature range Wdev equal to or higher than the device warming end temperature Tdev_dan.

Thereby, the cooling water flowing through the device circulation circuit 31 is cooled in the device radiator passage 36 by the device radiator 32. The cooled cooling water is supplied to the device passage 35. At this time, the temperature of the cooling water flowing into the device radiator passage 36 is relatively high, and the flow rate of the cooling water flowing through the device radiator passage 36 is relatively large. Thus, the cooling water is cooled by the device radiator 32 to the large extent. Therefore, the hybrid device 180 is cooled by the cooling water supplied to the device passage 35. In addition, the flow rate Rdev of the cooling water discharged from the device pump 33 is controlled to a flow rate (that is, the target flow rate Rdev_tgt) capable of maintaining the device temperature Tdev at the temperature within the predetermined device temperature range Wdev. Thus, the device temperature Tdev is maintained at the temperature within the predetermined device temperature range Wdev.

<Battery Warming Requested>

<Battery Warming Requested and Engine Warming not Requested>

When the battery 120 is requested to be warmed, and the engine 110 is not requested to be warmed, the embodiment apparatus sets the first control valve 65 and the second control valve 75 at the second connection positions, respectively. In addition, the embodiment apparatus sets the battery shut-off valve 24 and the device shut-off valve 34 at the closed positions, respectively and activates the battery pump 23. In this case, the embodiment apparatus stops activating the device pump 33 and the compressor 43. In addition, the embodiment apparatus sets the engine shut-off valve 14 at the open position and activates the engine pump 13.

Figure 5:
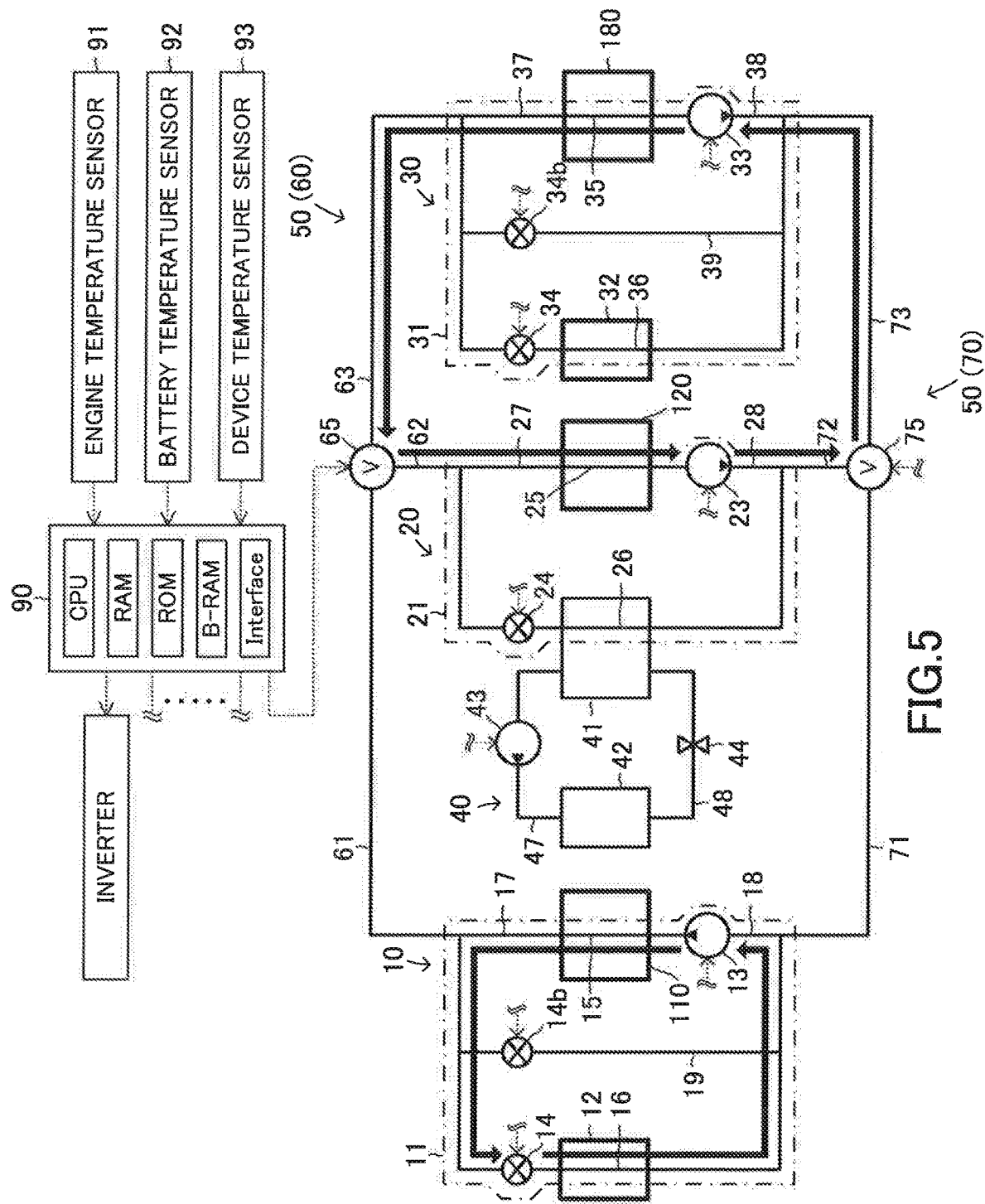
FIG. 5 is a view similar to FIG. 2 for showing the flow of the cooling water.

Thereby, the cooling water discharged from the battery pump 23 and the engine pump 13 flows as shown by arrows in FIG. 5. In particular, the cooling water discharged from the battery pump 23 flows through the second battery circulation passage 28, the second connection passage 72, the interior passage of the second control valve 75, the third connection passage 73, the second device circulation passage 38, the device passage 35, the first device circulation passage 37, the third connection passage 63, the interior passage of the first control valve 65, the second connection passage 62, the first battery circulation passage 27, the battery passage 25, and the second battery circulation passage 28 and flows into the battery pump 23.

The cooling water discharged from the engine pump 13 flows through the second engine circulation passage 18, the engine passage 15, the first engine circulation passage 17, the engine radiator passage 16, and the second engine circulation passage 18 and flows into the engine pump 13.

In this case, the embodiment apparatus controls the activation of the battery pump 23 so as to control the flow rate Rbat of the cooling water discharged from the battery pump 23 to a predetermined flow rate Rbat_dan. The predetermined flow rate Rbat_dan is set to a flow rate suitable for increasing the battery temperature Tbat by the cooling water supplied to the battery passage 25 after the cooling water flows through the device passage 35. The predetermined flow rate Rbat_dan is, for example, previously determined by an experiment.

Thereby, the cooling water warmed in the device passage 35 by the hybrid device 180 is supplied to the battery passage 25. In addition, the flow rate Rbat of the cooling water discharged from the battery pump 23 is controlled to a flow rate (that, is, the predetermined flow rate Rbat_dan) suitable for increasing the battery temperature Tbat. Thus, the battery temperature Tbat increases toward the battery warming end temperature Tbat_dan.

After the battery temperature Tbat reaches the battery warming end temperature Tbat_dan, the battery 120 is not requested to be warmed. Thus, the embodiment apparatus sets the first control valve 65 and the second control valve 75 at the shut-off positions, respectively and activates the device pump 33 as described above when the battery temperature Tbat reaches the battery warming end temperature Tbat_dan.

Further, the embodiment apparatus controls the activation of the engine pump 13 so as to control the flow rate Reng of the cooling water discharged from the engine pump 13 to the target flow rate Reng_tgt.

Thereby, the cooling water flowing in the engine circulation circuit 11 is cooled in the engine radiator passage 16 by the engine radiator 12. The cooled cooling water is supplied to the engine passage 15. At this time, the temperature of the cooling water flowing into the engine radiator passage 16 is relatively high, and the flow rate of the cooling water flowing through the engine radiator passage 16 is relatively large. Thus, the cooling, water is cooled by the engine radiator 12 to the large extent. Therefore, the engine 110 is cooled by the cooling water supplied to the engine passage 15. In addition, the flow rate Reng of the cooling water discharged from the engine pump 13 is controlled to the flow rate (that is, the target flow rate Reng_tgt) capable of maintaining the engine temperature Teng at the temperature within the predetermined engine temperature range Weng. Thus, the engine temperature Teng is maintained at the temperature within the predetermined engine temperature range Weng.

The embodiment apparatus sets the first control valve 65 and the second control valve 75 at the second shut-off positions, respectively for stopping supplying the cooling water from the engine circulation circuit 11 to the battery circulation circuit 21 when the battery 120 is requested to be warmed, and the engine 110 is not requested to be warmed. In this regard, the embodiment apparatus may be configured to connect the engine circulation circuit 11 and the battery circulation circuit 21 to each other via the first connection passage 61, the interior passage of the first control valve 65, and the first connection passage 71 for supplying the cooling water from the engine circulation circuit 11 to the battery circulation circuit 21 in order to use the heat of the cooling water flowing in the engine circulation circuit 11 for warming the battery 120 when the battery 120 is requested to be warmed, and the engine 110 is not requested to be warmed.

<Battery Warming Requested and Engine Warming Requested>

When the battery 120 is requested to be warmed, and the engine 110 is requested to be warmed, the embodiment apparatus sets the first control valve 65 and the second control valve 75 at the second connection positions, respectively while the battery temperature Tbat is lower than a predetermined temperature Tbat_th lower than the battery warming end temperature Tbat_dan. Hereinafter, the predetermined temperature Tbat_th lower than the battery warming end temperature Tbat_dan will be referred to as "the connection switching temperature Tbat_th". In addition, the embodiment apparatus sets the battery shut-off valve 24, the device shut-off valve 34, and the device bypass shut-off valve 34b at the closed positions, respectively and activates the battery pump 23. At this time, the embodiment apparatus stops activating the device pump 33 and the compressor 43. In addition, the embodiment apparatus sets the engine shut-off valve 14 at the closed position, sets the engine bypass shut-off valve 14b at the open position, and activates the engine pump 13.

Figure 6:
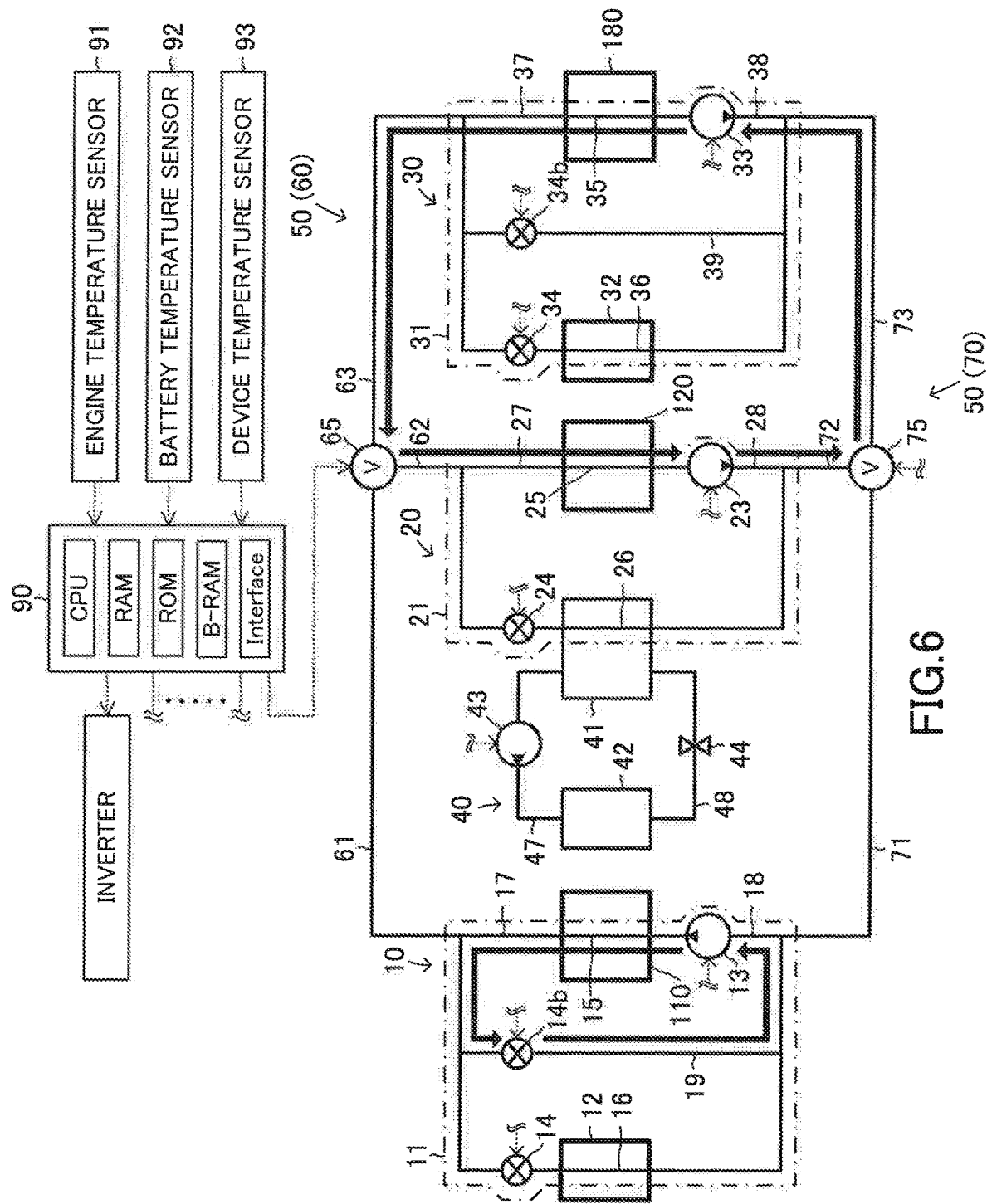
FIG. 6 is a view similar to FIG. 2 for showing the flow of the cooling water.

Thereby, the cooling water discharged from the battery pump 23 flows as shown by arrows in FIG. 6. In particular, the cooling water discharged from the battery pump 23 flows through the second battery circulation passage 28, the second connection passage 72, the interior passage of the second control valve 75, the third connection passage 73, the second device circulation passage 38, the device passage 35, the first device circulation passage 37, the third connection passage 63, the interior passage of the first control valve 65, the second connection passage 62, the first battery circulation passage 27, the battery passage 25, and the second battery circulation passage 28 and flows into the battery pump 23.

In this case, the embodiment apparatus controls the activation of the battery pump 23 so as to control the flow rate Rbat of the cooling water discharged from the battery pump 23 to the predetermined flow rate Rbat_dan.

Thereby, the cooling water heated in the device passage 35 by the hybrid device 180 is supplied to the battery passage 25. In addition, the flow rate Rbat of the cooling water discharged from the battery pump 23 is controlled to the flow rate suitable for increasing the battery temperature Tbat. Thus, the battery temperature Tbat increases toward the battery warming end temperature Tbat_dan.

The cooling water discharged from the engine pump 13 flows as shown by the arrows in FIG. 6. In particular, the cooling water discharged from the engine pump 13 flows through the second engine circulation passage 18, the engine passage 15, the first engine circulation passage 17, the engine bypass passage 19, and the second engine circulation passage 18 and flows into the engine pump 13.

In addition, the embodiment apparatus controls the activation of the engine pump 13 so as to control the flow rate Reng of the cooling water discharged from the engine pump 13 to the minimum flow rate Reng_min.

Thereby, the cooling water having the minimum flow rate Reng_min is supplied to the engine passage 15 without flowing through the engine radiator passage 16. Thus, the engine temperature Teng increases toward the engine warming end temperature Tengdan.

When the battery temperature Tbat reaches the connection switching temperature Tbat_th, the embodiment apparatus sets the first control valve 65 and the second control valve 75 at the first connection positions, respectively. In addition, the embodiment apparatus maintains the engine shut-off valve 14, the battery shut-off valve 24, the device bypass shut-off valve 34b at the closed positions, respectively, sets the engine bypass shut-off valve 14b at the closed position, and sets the device shut-off valve 34 at the open position. In addition, the embodiment apparatus continues to activate the engine pump 13 and stop activating the compressor 43, activates the device pump 33, and stops activating the battery pump 23.

Figure 7:
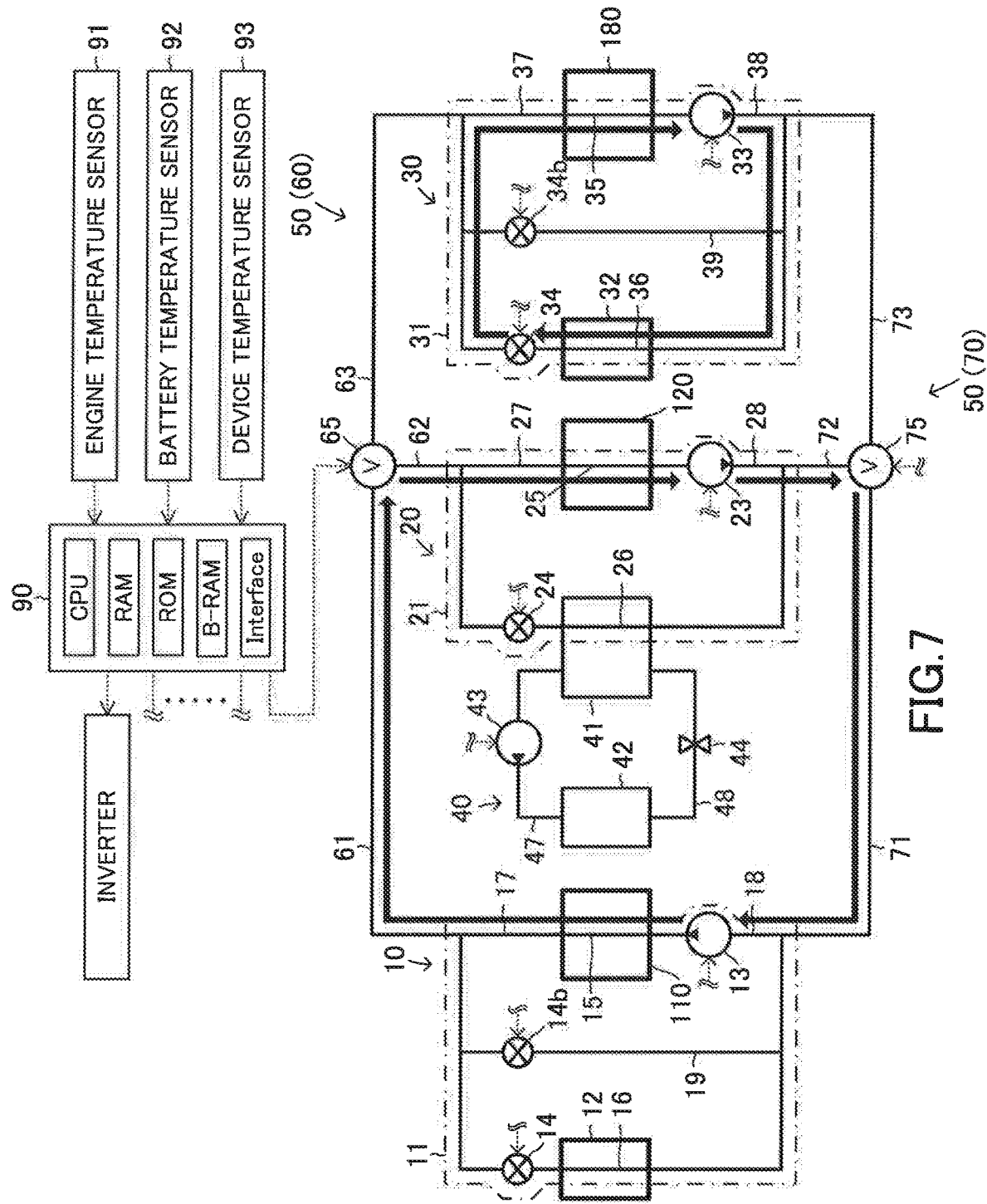
FIG. 7 is a view similar to FIG. 2 for showing the flow of the cooling water.

Thereby, the cooling water discharged from the engine pump 13 and the device pump 33 flows as shown by arrows in FIG. 7.

In particular, the cooling water discharged from the engine pump 13 flows through the second engine circulation passage 18, the engine passage 15, the first engine circulation passage 17, the first connection passage 61, the interior passage of the first control valve 65, the second connection passage 62, the first battery circulation passage 27, the battery passage 25, the second battery circulation passage 28, the second connection passage 72, the interior passage of the second control valve 75, the first connection passage 71, and the second engine circulation passage 18 and flows into the engine pump 13.

The cooling water discharged from the device pump 33 flows through the second device circulation passage 38, the device radiator passage 36, the first device circulation passage 37, the device passage 35, and the second device circulation passage 38 and flows into the device pump 33.

In addition, the embodiment apparatus controls the activation of the engine pump 13 so as to control the flow rate Reng of the cooling water discharged from the engine pump 13 to a predetermined flow rate Reng_dan. The predetermined flow rate Reng_dan is set to a flow rate suitable for increasing the battery temperature Tbat by the cooling water supplied to the battery passage 25 after the cooling water flows through the engine passage 15. The predetermined flow rate Reng_dan is, for example, previously determined by an experiment.

Thereby, the cooling water heated in the engine passage 15 by the engine 110 is supplied to the battery passage 25. In addition, the flow rate Reng of the cooling water discharged from the engine pump 13 is controlled to the flow rate (that is, the predetermined flow rate Reng_dan) suitable for increasing the battery temperature Tbat. Thus, the battery temperature Tbat increases toward the battery warming end temperature Tbat_dan.

Thereby, for example, when the engine 110 is requested to be operated, the first and second motor, generators are requested to be activated, the engine temperature Teng is lower than the engine warming end temperature Teng_dan, and the battery temperature Tbat is lower than the battery warming end temperature Tbat_dan, the cooling water flowing only in the engine circulation circuit 11 is supplied to the engine passage 15, and the flow rate Reng of the cooling water discharged from the engine pump 13 is controlled to the minimum flow rate Reng_min until the battery temperature Tbat reaches the connection switching temperature Tbat_th. Thus, the engine temperature Teng increases at a large increasing rate. Therefore, the amount of the emission included in the exhaust gas discharged from the engine 110 can be maintained at a small amount.

In addition, the cooling water which has flowed through the engine passage 15 is supplied to the battery passage 25, and the heat of the cooling water is supplied to the battery 120 after the battery temperature Tbat reaches the connection switching temperature Tbat_th. Thus, the increasing rate of the engine temperature Teng decreases. In this regard, the engine temperature Teng already reaches a relatively high temperature when the battery temperature Tbat reaches the connection switching temperature Tbat_th. Thus, the amount of the emission included in the exhaust gas discharged from the engine 110 can be maintained at the small amount after the battery temperature Tbat reaches the connection switching, temperature Tbat_th.

The temperature of the cooling water is increased by the heat of the engine 110 when the cooling water flows through the engine passage 15. The cooling water having a high temperature increased by the heat of the engine 110 is not supplied to the battery passage 25 until the battery temperature Tbat reaches the connection switching temperature Tbat_th. On the other hand, the temperature of the cooling water is increased by the heat of the hybrid device 180 when the cooling water flows through the device passage 35. The cooling water having a relatively high temperature increased by the heat of the hybrid device 180 is supplied to the battery passage 25. Thus, the battery temperature Tbat increases even when the cooling water which has flowed through the engine passage 15 is not supplied to the battery passage 25.

In addition, the cooling water having the high temperature increased by the heat of the engine 110 is supplied to the battery passage 25 after the battery temperature Tbat reaches the connection switching temperature Tbat_th. Thus, the battery temperature Tbat increases at the large increasing rate.

The amount of the emission included in the exhaust gas discharged from, the engine 110 can be maintained at the small amount, and the battery temperature Tbat can be increased to the battery warming end temperature Tbat_dan at the large increasing rate by flowing the cooling water as described above until the battery temperature Tbat reaches the battery warming end temperature Tbat_dan.

When the hybrid device 180 is requested to be warmed, the embodiment apparatus controls the activation of the device pump 33 so as to control the flow rate Rdev of the cooling water discharged from the device pump 33 to the minimum flow rate Rdev_min.

Thereby, the cooling water cooled in the device radiator passage 36 is supplied to the device passage 35. In this regard, the temperature of the cooling water flowing into the device radiator passage 36 is relatively low, and the flow rate of the cooling water flowing through the device radiator passage 36 is the minimum flow rate. Thus, the cooling water is cooled by the device radiator 32 to an extremely small extent. Therefore, the battery temperature Tbat increases toward the battery warming end temperature Tbat_dan.

On the other hand, when the hybrid device 180 is not requested to be warmed, that is the hybrid device 180 is requested to be cooled, the embodiment apparatus controls the activation of the device pump 33 so as to control, the flow rate Rdev of the cooling water discharged from the device pump 33 to the target flow rate Rdev_tgt.

Thereby, the cooling water flowing in the device circulation circuit 31 is cooled in the device radiator passage 36 by the device radiator 32. The cooled cooling water is supplied to the device passage 35. At this time, the temperature of the cooling water flowing into the device radiator passage 36 is relatively high, and the flow rate of the cooling water flowing through the device passage 35 is relatively large. Thus, the cooling water is cooled by the device radiator 32 to the large extent. Therefore, the hybrid device 180 is cooled by the cooling water supplied to the device passage 35. In addition, the flow rate Rdev of the cooling water discharged from the device pump 33 is controlled to the flow rate (that is, the target flow rate Rdev_tgt) capable of maintaining the device temperature Tdev at the temperature within the predetermined device temperature range Wdev. Thus, the device temperature Tdev can be maintained at the temperature within the predetermined device temperature range Wdev.

<Concrete Operation of Embodiment Apparatus>

Figure 8:
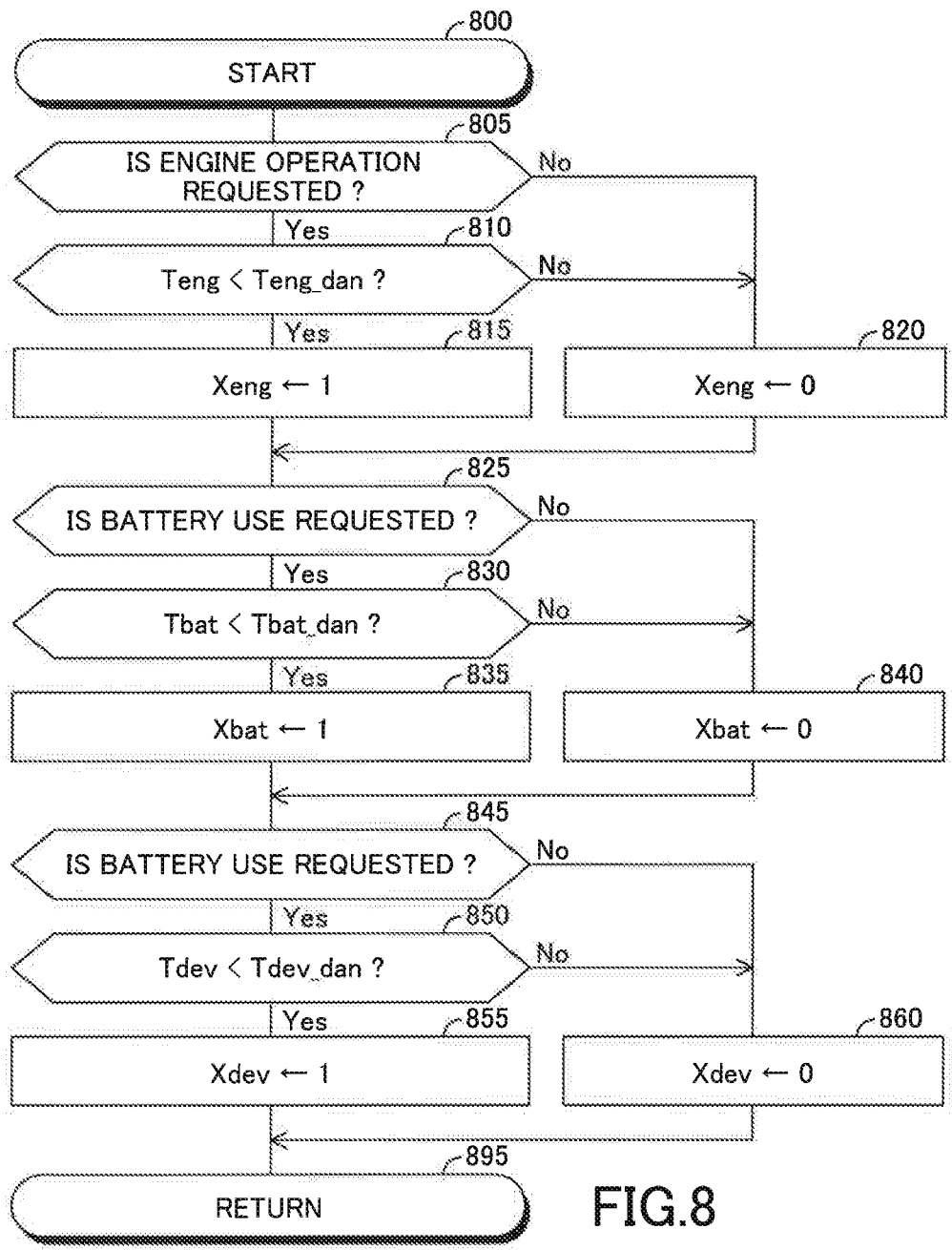
FIG. 8 is a view for showing a flowchart of a routine executed by a CPU of an ECU shown in FIG. 2.

Next, a concrete operation of the embodiment apparatus will be described. The CPU of the ECU 90 of the embodiment apparatus is configured or programmed to execute a routine shown by a flowchart in FIG. 8 each time a predetermined time elapses. Therefore, at a predetermined timing, the CPU starts a process from a step 800 in FIG. 8 and then, proceeds with the process to a step 805 to determine whether the engine 110 is requested to be operated.

When the engine 110 is requested to be operated, the CPU determines "Yes" at the step 805 and then, proceeds with the process to a step 810 to determine whether the engine temperature Teng is lower than the engine warming end temperature Teng_dan.

When the engine temperature Teng is lower than the engine warming end temperature Teng_dan, the CPU determines "Yes" at the step 810 and then, executes a process of a step 815 described below. Thereafter, the CPU proceeds with the process to a step 825.

Step 815: The CPU sets a value of an engine warming request flag Xeng to "1". The engine warming, request flag Xeng represents that the engine 110 is requested to be warmed when the value of the engine warming request flag Xeng is "1". The engine, warming request flag Xeng represents that the engine 110 is not requested to be warmed, that is, the engine 110 is requested to be cooled when the value of the engine warming request flag Xeng is "0".

On the other hand, when the engine temperature Teng is equal to or higher than the engine warming end temperature Teng_dan, the CPU determines "No" at the step 810 and then, executes a process of a step 820 described below. In addition, when the engine 110 is not requested to be operated at a time of executing a process of the step 805, the CPU determines "No" at the step 805 and then, executes the process of the step 820. Thereafter, the CPU proceeds with the process to the step 825.

Step 820: The CPU sets the value of the engine warming request flag Xeng to "0".

When the CPU proceeds with the process to the step 825, the CPU determines whether the battery 120 is requested to be used. When the battery 120 is requested to be used, the CPU determines "Yes" at the step 825 and then, proceeds with the process to a step 830 to determine whether the battery temperature Tbat is lower than the battery warming end temperature Tbat_dan.

When the battery temperature Tbat is lower than the battery warming end temperature Tbat_dan, the CPU determines "Yes" at the step 830 and then, executes a process of a step 835 described below. Thereafter, the CPU proceeds with the process to a step 845.

Step 835: The CPU sets a value of a battery warming request flag Xbat to "1". The battery warming request flag Xbat represents that the battery 120 is requested to be warmed when the value of the battery warming request flag Xbat is "1". The battery warming request flag Xbat represents that the battery 120 is not requested to be warmed, that is, the battery 120 is requested to be cooled when the value of the battery warming request flag Xbat is "0".

On the other hand, when the battery temperature Tbat is equal to or higher than the battery warming end temperature Tbat_dan, the CPU determines "No" at, the step 830 and then, executes a process of a step 840 described below. In addition, when the battery 120 is not requested to be used at a time of executing a process of the step 825, the CPU determines "No" at the step 825 and then, executes the process of the step 840 described below. Thereafter, the CPU proceeds with the process to the step 845.

Step 840: The CPU sets the value of the battery warming request flag Xbat to "0".

When the CPU proceeds with the process to the step 845, the CPU determines whether the battery 120 is requested to be used. When the battery 120 is requested to be used, the CPU determines "Yes" at the step 845 and then, proceeds with the process to a step 850 to determine whether the device temperature Tdev is lower than the device warming end temperature Tdev_dan.

When the device temperature Tdev is lower than the device warming end temperature Tdev_dan, the CPU determines "Yes" at the step 850 and then, executes a process of a step 855 described below. Thereafter, the CPU proceeds with the process to a step 895 to terminate this routine once.

Step 855: The CPU sets a value of a device warming request flag Xdev to "1". The device warming request flag Xdev represents that the hybrid device 180 is requested to be warmed when the value of the device warming request flag Xdev is "1". The device warming request flag Xdev represents that the hybrid device 180 is not requested to be warmed, that is, the hybrid device 180 is requested to be cooled when the value of the device warming request flag Xdev is "0".

On the other hand, when the device temperature Tdev is equal to or higher than the device warming end temperature Tdev_dan, the CPU determines "No" at the step 850 and then, executes a process of a step 860 described below. In addition, when the battery 120 is not requested to be used at a time of executing a process of the step 845, the CPU determines "No" at the step 845 and then, executes the process of the step 860. Thereafter, the CPU proceeds with the process to the step 895 to terminate this routine once.

Step 860: The CPU sets the value of the device warming request flag Xdev to "0".

Figure 9:
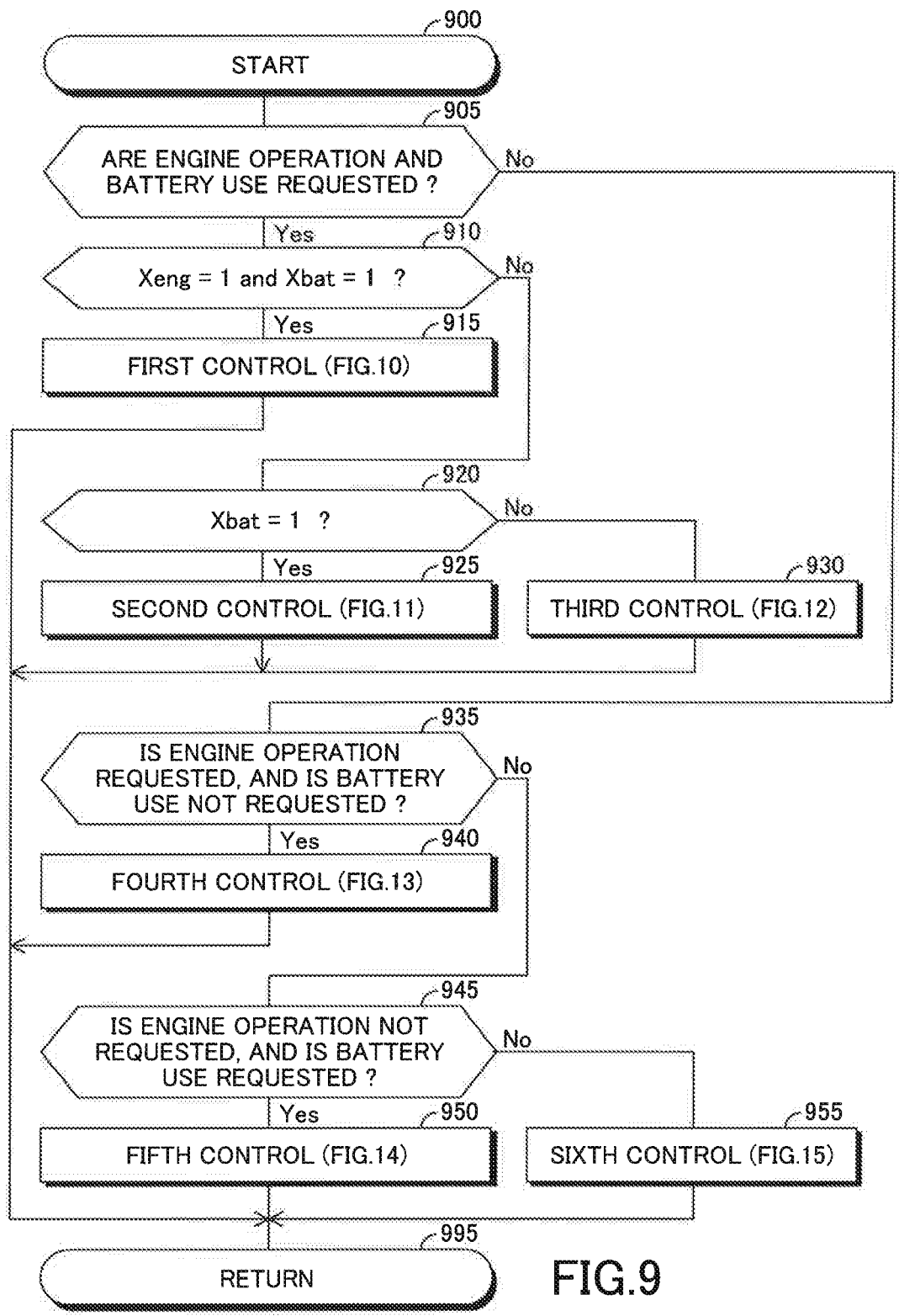
FIG. 9 is a view for showing a flowchart of a routine executed by the CPU.

Further, the CPU is configured or programmed to execute a routine shown by a flowchart in FIG. 9 each time a predetermined time elapses. Therefore, at a predetermined timing, the CPU starts a process from a step 900 and then, proceeds with the process to a step 905 to determine whether the engine 110 is requested to be operated, and, the battery 120 is requested to be used.

When the engine 110 is requested to be operated, and the battery 120 is requested to be used, the CPU determines "Yes" at the step 905 and then, proceeds with the process to a step 910 to determine whether the value of the engine warming request flag Xeng is "1", and the value of the battery warming request flag Xbat is "1".

Figure 10:
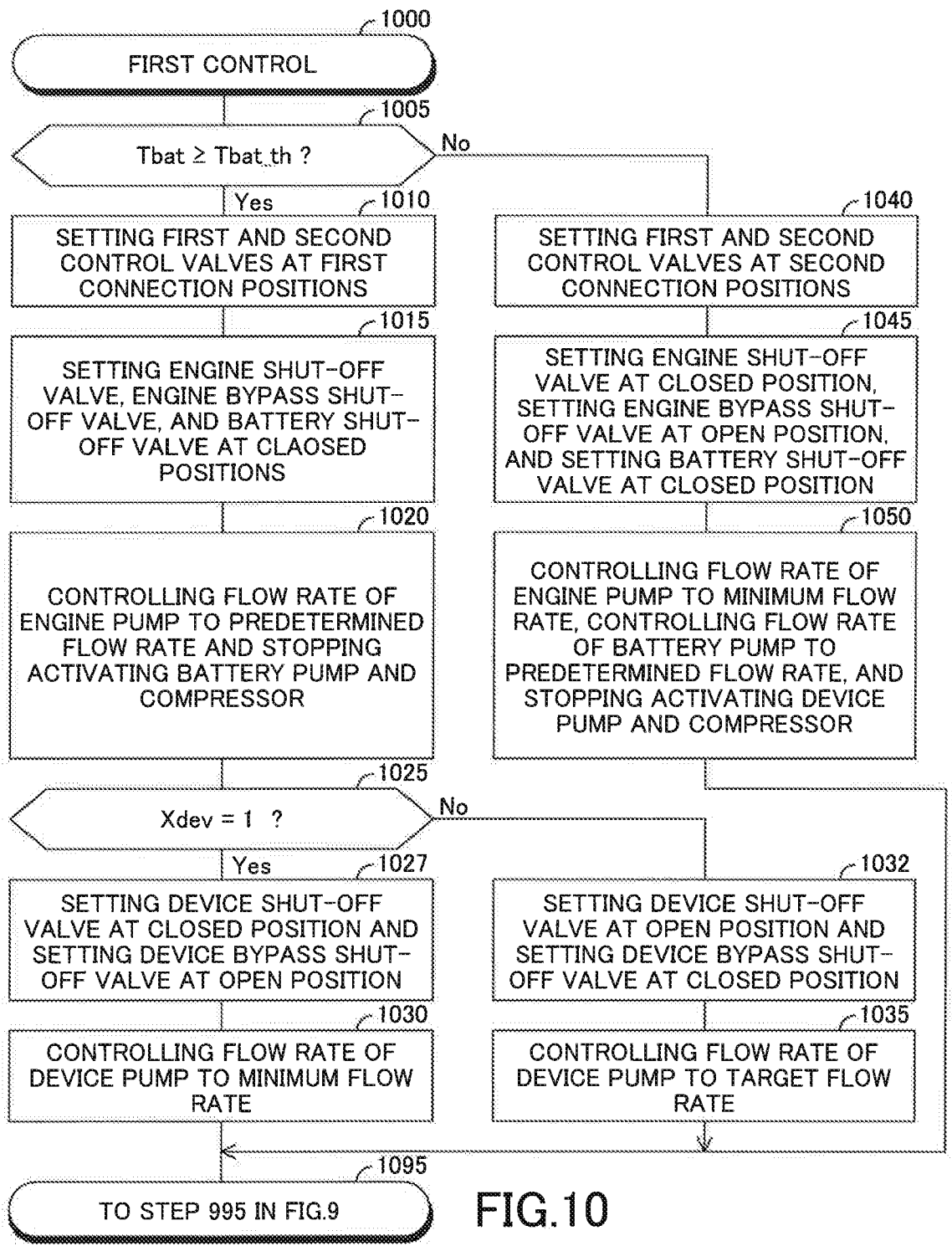
FIG. 10 is a view for showing a flowchart of a routine executed by the CPU.

When the value of the engine warming request flag Xeng is "1", and the value of the battery warming request flag Xbat is "1", the CPU determines "Yes" at the step 910 and then, proceeds with the process to a step 915 to execute a routine shown by a flowchart in FIG. 10.

Therefore, when the CPU proceeds with the process to the step 915, the CPU starts a process from a step 1000 and then, proceeds with the process to a step 1005 to determine whether the battery temperature Tbat is equal to or higher than the connection switching temperature Tbat_th. As described above, the connection switching temperature Tbat_th is set to the temperature lower than the battery warming end temperature Tbat dare.

When the battery temperature Tbat is lower than the connection switching temperature Tbat_th, the CPU determines "No" at the step 1005 and then, sequentially executes processes of steps 1040 to 1050 described below. Thereafter, the CPU proceeds with the process to a step 995 in FIG. 9 via a step 1095 to terminate this routine once.

Step 1040: The CPU sets the first control valve 65 and the second control valve 75 at the second connection positions, respectively.

Step 1045: The CPU sets the engine shut-off valve 14 at the closed position, sets the engine bypass shut-off valve 14*b* at the open position, and sets the battery shut-off valve 24, the device shut-off valve 34, and the device bypass shut-off valve 34*b* at the closed positions, respectively.

Step 1050: The CPU activates the engine pump 13 and the battery pump 23 and stops activating the device pump 33 and the compressor 43. At this time, the CPU controls the activation of the engine pump 13 so as to control the flow rate Reng of the cooling water discharged from the engine pump 13 to the minimum flow rate Reng_min. In addition, the CPU controls the activation of the battery pump 23 so as to control the flow rate Rbat of the cooling water discharged from the battery pump 23 to the predetermined flow rate Rbat_dan.

It should be noted that the CPU continues to activate the engine pump 13 when the engine pump 13 is already activated at a time of executing the process of the step 1050. Similarly, the CPU continues to activate the battery pump 23 when the battery pump 23 is already activated at the time of executing the process of the step 1050. In addition, the CPU continues to stop activating the device pump 33 when the activation of the device pump 33 is already stopped at the time of executing the process of the step 1050. Similarly, the CPU continues to step activating the compressor 43 when the activation of the compressor 43 is already stopped at the time of executing the process of the step 1050.

When the battery temperature Tbat is equal to or higher than the connection switching temperature Tbat_th at a time of executing a process of the step 1005, the CPU determines "Yes" at the step 1005 and then, sequentially executes processes of steps 1010 to 1020 described below. Thereafter, the CPU proceeds with the process to a step 1025.

Step 1010: The CPU sets the first control valve 65 and the second control valve 75 at the first connection positions, respectively.

Step 1015: The CPU sets the engine shut-off valve 14, the engine bypass shut-off valve 14*b*, and the battery shut-off valve 24 at the closed positions, respectively.

Step 1020: The CPU activates the engine, pump 13 and stops activating the battery pump 23 and the compressor 43. At this time, the CPU controls the activation of the engine pump 13 so as to control the flow rate Reng of the cooling water discharged from the engine pump 13 to the predetermined flow rate Reng_dan.

It should be noted that the CPU continues to activate the engine pump 13 when the engine pump 13 is already activated at a time of executing the process of the step 1020. In addition, the CPU continues to stop activating the battery pump 23 when the activation of the battery pump 23 is already stopped at the time of executing the process of the step 1020. Similarly, the CPU continues to stop activating the compressor 43 when the activation of the compressor 43 is already stopped at the time of executing the process of the step 1020.

When the CPU proceeds with the process to the step 1025, the CPU determines whether the value of the device warming request flag Xdev is "1". When the value of the device warming request flag Xdev is "1", the CPU determines "Yes" at the step 1025 and then, sequentially executes processes of steps 1027 and 1030 described below. Thereafter, the CPU proceeds with the process to the step 995 in FIG. 9 via the step 1095 to terminate this routine once.

Step 1027: The CPU sets the device shut-off valve 34 at the closed position and sets the device bypass shut-off valve 34*b* at the open position.

Step 1030: The CPU activates the device pump 33. At this time, the CPU controls the activation of the device pump 33 so as to control the flow rate Rdev of the cooling water discharged from the device pump 33 to the minimum flow rate Rdev_min.

It should be noted that the CPU continues to activate the device pump 33 when the device pump 33 is already activated at a time of executing the process of the step 1030.

On the other hand, when the value of the device warming request flag Xdev is "0", the CPU determines "No" at the step 1025 and then, sequentially executes processes of steps 1032 and 1035 described below. Thereafter, the CPU proceeds with the process to the step 995 in FIG. 9 via the step 1095 to terminate this routine once.

Step 1032: The CPU sets the device shut-off valve 34 at the open position and sets the device bypass shut-off valve 34*b* at the closed position.

Step 1035: The CPU activates the device pump 33. At this time, the CPU controls the activation of the device pump 33 so as to control the flow rate Rdev of the cooling water discharged from the device pump 33 to the target flow rate Rdev_tgt.

Referring now to FIG. 9, when any of the values of the engine warming request flag Xeng and the battery warming request flag Xbat is "0" at a time of executing a process of the step 910, the CPU determines "No" at the step 910 and then, proceeds with the process to a step 920 to determine whether the value of the battery warming request flag Xbat is "1".

Figure 11:
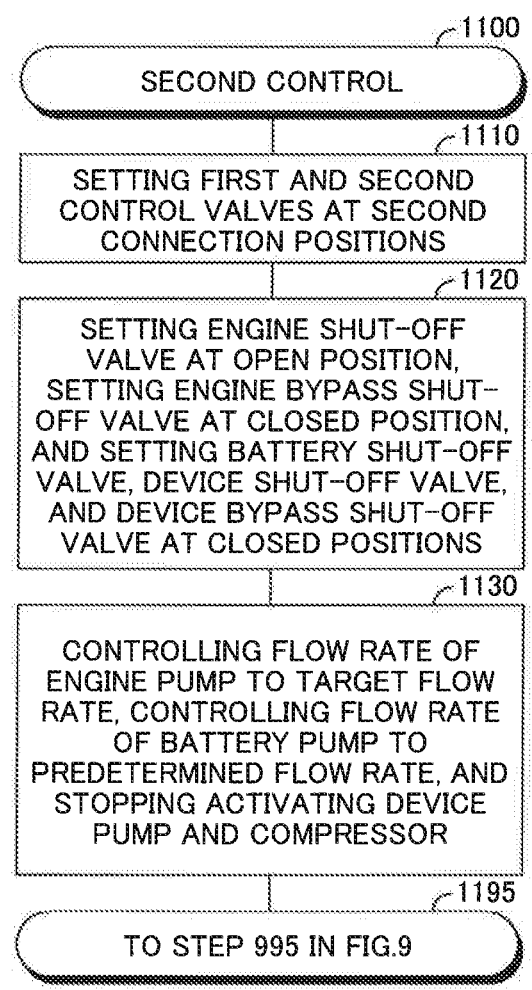
FIG. 11 is a view for showing a flowchart of a routine executed, by the CPU.

When the value of the battery warming request flag Xbat is "1", the CPU determines "Yes" at the step 920 and then, proceeds with the process to a step 925 to execute a routine shown by a flowchart in FIG. 11.

Therefore, when the CPU proceeds with the process to the step 925, the CPU starts a process from a step 1100 in FIG. 11 and then, sequentially executes processes of steps 1110 to

1130. Thereafter, the CPU proceeds with the process to the step 995 in FIG. 9 via a step 1195 to terminate this routine once.

Step 1110: The CPU sets the first control valve 65 and the second control valve 75 at the second connection positions, respectively.

Step 1120: The CPU sets the engine shut-off valve 14 at the open position and sets the engine bypass shut-off valve 14*b*, the battery shut-off valve 24, the device shut-off valve 34, and the device bypass shut-off valve 34*b* at the closed positions, respectively.

Step 1130: The CPU activates the engine pump 13 and the battery pump 23 and stops activating the device pump 33 and the compressor 43. At this time, the CPU controls the activation of the engine pump 13 so as to control the flow rate Reng of the cooling water discharged from the engine pump 13 to the target flow rate Reng_tgt. In addition, the CPU controls the activation of the battery pump 23 so as to control the flow rate Rbat of the cooling water discharged from the battery pump 23 to the predetermined flow rate Rbat_dan.

It should be noted that the CPU continues to activate the engine pump 13 when the engine pump 13 is already activated at a time of executing the process of the step 1130. Similarly, the CPU continues to activate the battery pump 23 when the battery pump 23 is already activated at the time of executing the process of the step 1130. In addition, the CPU continues to stop activating the device pump 33 when the activation of the device pump 33 is already stopped at the time of executing the process of the step 1130. Similarly, the CPU continues to stop activating the compressor 43 when the activation of the compressor 43 is already stopped at the time of executing the process of the step 1130.

Figure 12:
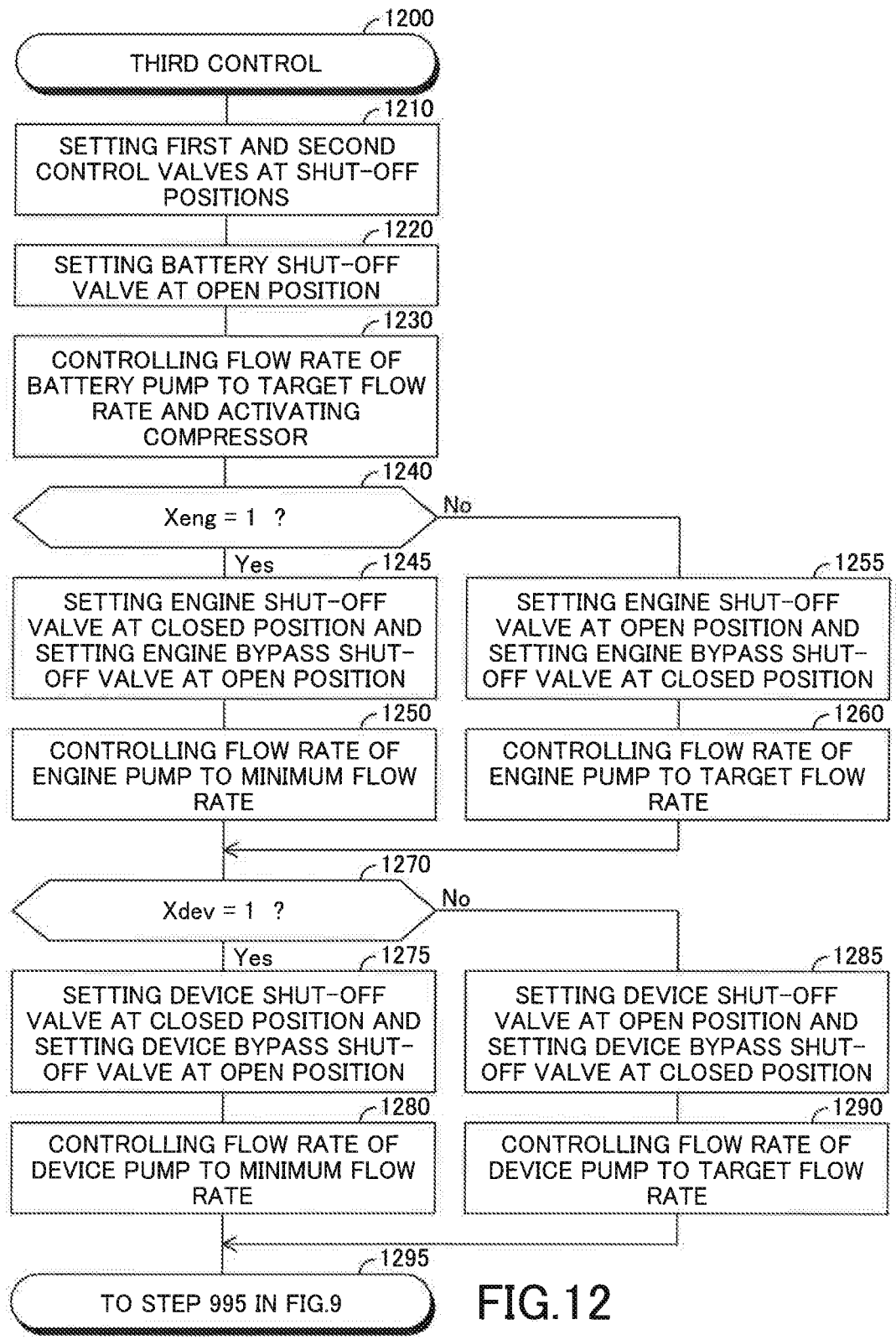
FIG. 12 is a view for showing a flowchart of a routine executed by the CPU.

Referring now to FIG. 9, when the value of the battery warming request flag Xbat is "0" at a time of executing a process of the step 920, the CPU determines "No" at the step 920 and then, proceeds with the process to a step 930 to execute a routine shown by a flowchart in FIG. 12.

Therefore, when, the CPU proceeds with the process to the step 930, the CPU starts a process from a step 1200 in FIG. 12 and then, sequentially executes processes of steps 1210 to 1230. Thereafter, the CPU proceeds with the process to a step 1240.

Step 1210: The CPU sets the first control valve 65 and the second control valve 75 at the shut-off positions, respectively.

Step 1220: The CPU sets the battery shut-off valve 24 at the open position.

Step 1230: The CPU activates the battery pump 23 and the compressor 43. At this time, the CPU controls the activation of the battery pump 23 so as to control the flow rate Rbat of the cooling water discharged from the battery pump 23 to the minimum flow rate Rbat_min.

It should be noted that the CPU continues to activate the battery pump 23 when the battery pump 23 is already activated at a time of executing the process of the step 1230. Similarly, the CPU continues to activate the compressor 43 when the compressor 43 is already activated at the time of executing the process of the step 1230.

When the CPU proceeds with the process to the step 1240, the CPU determines whether the value of the engine warming request flag Xeng is "1". When the value of the engine warming request flag Xeng is "1", the CPU determines "Yes" at the step 1240 and then, sequentially executes processes of steps 1245 and 1250 described below. Thereafter, the CPU proceeds with the process to a step 1270.

Step 1245: The CPU sets the engine shut-off valve 14 at the closed position and sets the engine bypass shut-off valve 14*b* at the open position.

Step 1250: The CPU activates the engine pump 13. At this time, the CPU controls the engine pump 13 so as to control the flow rate Reng of the cooling water discharged from the engine pump 13 to the minimum flow rate Reng_min.

It should be noted that the CPU continues to activate the engine pump 13 when the engine pump 13 is already activated at a time of executing the process of the step 1250.

On the other hand, when the value of the engine warming request flag Xeng is "0", the CPU determines "No" at the step 1240 and then, sequentially executes processes of steps 1255 and 1260 described below. Thereafter, the CPU proceeds with the process to the step 1270.

Step 1255: The CPU sets the engine shut-off valve 14 at the open position and sets the engine bypass shut-off valve 14*b* at the closed position.

Step 1260: The CPU activates the engine pump 13. At this time, the CPU controls the activation of the engine pump 13 so as to control the flow rate Reng of the cooling water discharged from the engine pump 13 to the target flow rate Reng_tgt.

It should be noted that the CPU continues to activate the engine pump 13 when the engine pump 13 is already activated at a time of executing the process of the step 1250.

When the CPU proceeds with the process to the step 1270, the CPU determines whether the value of the device warming request flag Xdev is "1". When the value of the device warming request flag Xdev is "1", the CPU determines "Yes" at the step 1270 and then, sequentially executes processes of steps 1275 and 1280 described below. Thereafter, the CPU proceeds with the process to the step 995 in FIG. 9 via a step 1295 to terminate this routine once.

Step 1275: The CPU sets the device shut-off valve 34 at the closed position and sets the device bypass shut-off valve 34*b* at the open position.

Step 1280: The CPU activates the device pump 33. At this time, the CPU controls the device pump 33 so as to control the flow rate Rdev of the cooling water discharged from the device pump 33 to the minimum flow rate Rdev_min.

It should be noted that the CPU continues to activate the device pump 33 when the device pump 33 is already activated at a time of executing the process of the step 1280.

On the other hand, when the value of the device warming request flag Xdev is "0", the CPU determines "No" at the step 1270 and then, sequentially executes processes of steps 1285 and 1290 described below. Thereafter, the CPU proceeds with the process to the step 995 in FIG. 9 via the step 1295 to terminate this routine once.

Step 1285: The CPU sets the device shut-off valve 34 at the open position and set the device bypass shut-off valve 34*b* at the closed position.

Step 1290: The CPU activates the device pump 33. At this time, the CPU controls the activation of the device pump 33 so as to control the flow rate Rdev of the cooling water discharged from the device pump 33 to the target flow rate Rdev_tgt.

It should be noted that the CPU continues to activate the device pump 33 when the device pump 33 is already activated at a time of executing the process, of the step 1290.

Referring now to FIG. 9, when the engine 110 is not requested to be operated, or the battery 120 is not requested to be used at a time of executing a process of the step 905, the CPU determines "No" at the step 905 and then, proceeds with the process to a step 935 to determines whether the engine 110 is requested to be operated, and the battery 120 is not requested to be used.

Figure 13:
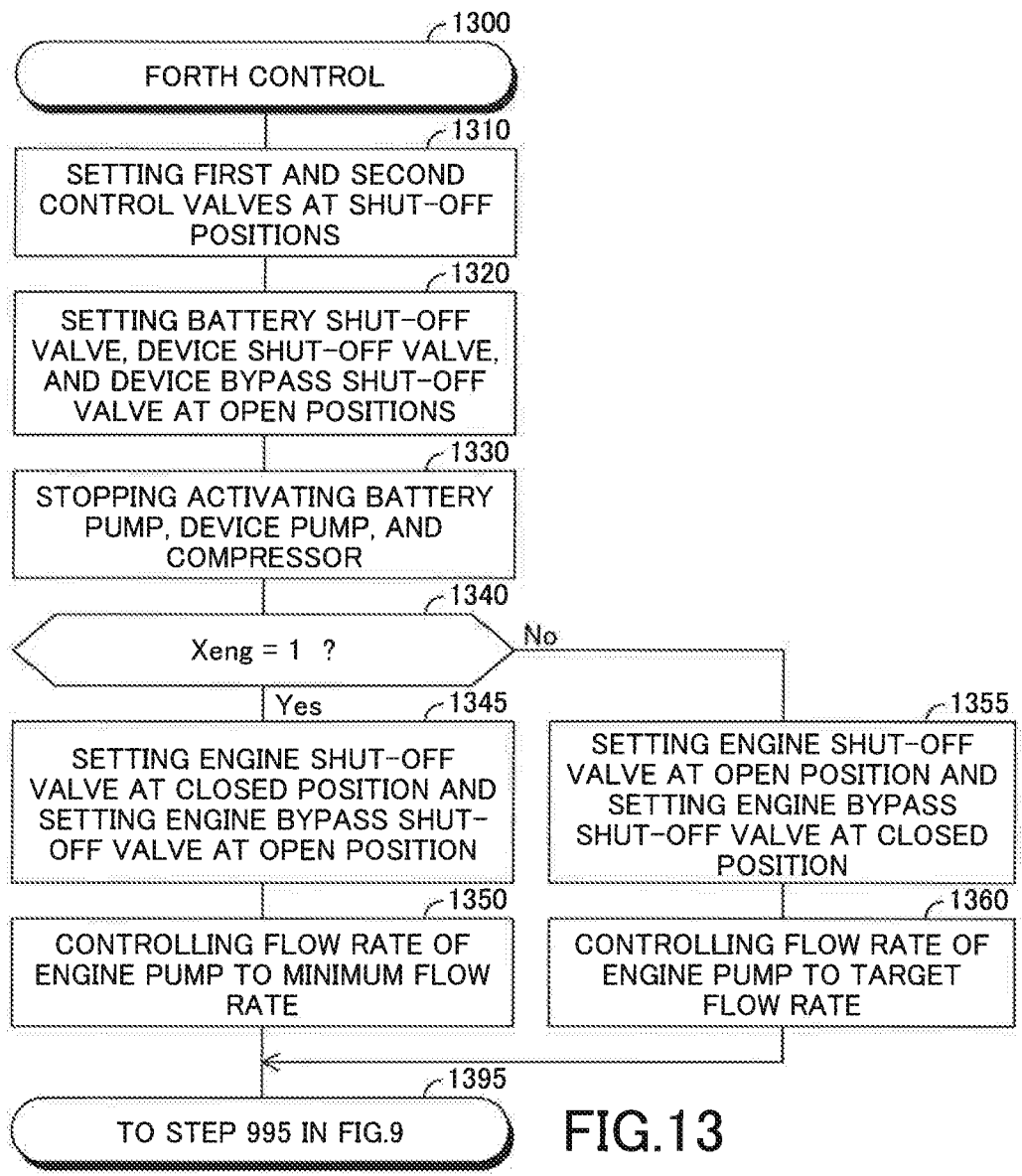
FIG. 13 is a view for showing a flowchart of a routine executed by the CPU.

When the engine 110 is requested to be operated, and the battery 120 is not requested to be used, the CPU determines "Yes" at the step 935 and then, proceeds with the process to a step 940 to execute a routine shown by a flowchart in FIG. 13.

Therefore, when the CPU proceeds with the process to the step 940, the CPU starts a process from a step 1300 and then, sequentially executes processes of steps 1310 to 1330. Thereafter, the CPU proceeds with the process to a step 1340.

Step 1310': The CPU sets the first control valve 65 and the second control valve 75 at the shut-off positions, respectively.

Step 1320: The CPU sets the battery shut-off valve 24, the device shut-off valve 34, and the device bypass shut-off valve 34b at the open positions, respectively.

Step 1330: The CPU stops activating the battery pump 23, the device pump 33, and the compressor 43.

It should be noted that the CPU continues to stop activating the battery pump 23 when the activation of the battery pump 23 is already stopped at a time of executing the process of the step 1330. Similarly, the CPU continues to stop activating the device pump 33 when the activation of the device pump 33 is already stopped at the time of executing the process of the step 1330. Similarly, the CPU continues to stop activating the compressor 43 when the activation of the compressor 43 is already stopped at the time of executing the process of the step 1330.

When the CPU proceeds with the process to the step 1340, the CPU determines whether the value of the engine warming request flag Xeng is "1". When the value of the engine warming request flag Xeng is "1" the CPU determines "Yes" at the step 1340 and then, sequentially executes processes of steps 1345 and 1350 described below. Thereafter, the CPU proceeds with the process to the step 995 in FIG. 9 via a step 1395 to terminate this routine once.

Step 1345: The CPU sets the engine shut-off valve 14 at the closed position and sets the engine bypass shut-off valve 14b at the open position.

Step 1350: The CPU activates the engine pump 13. At this time, the CPU controls the activation of the engine pump 13 so as to control the flow rate Reng of the cooling water discharged from the engine pump 13 to the minimum flow rate Reng_min.

It should be noted that the CPU continues to activate the engine pump 13 when, the engine pump 13 is already activated at a time of executing the process of the step 1350.

On the other hand, when the value of the engine warming request flag Xeng is "0", the CPU determines "No" at the step 1340 and then, sequentially executes processes of steps 1355 and 1360 described below. Thereafter, the CPU proceeds with the process to the step 995 in FIG. 9 via the step 1395 to terminate this routine once.

Step 1355: The CPU sets the engine shut-off valve 14 at the open position and sets the engine bypass shut-off valve 14b at the closed position.

Step 1360': The CPU activates the engine pump 13. At this time, the CPU controls the activation of the engine pump 13 so as to control the flow rate Reng of the cooling water discharged from the engine pump 13 to the target flow rate Reng_tgt.

It should be noted that the CPU continues to activate the engine pump 13 when the engine pump 13 is already activated at a time of executing the process of the step 1360.

Referring now to FIG. 9, when the engine 110 is not requested to be operated, or the battery 120 is not requested to be used at a time of executing a process of the step 935, the CPU determines "No" at the step 935 and then, proceeds with the process to a step 945 to determine whether the engine 110 is not requested to be operated, and the battery 120 is requested to be used.

Figure 14:
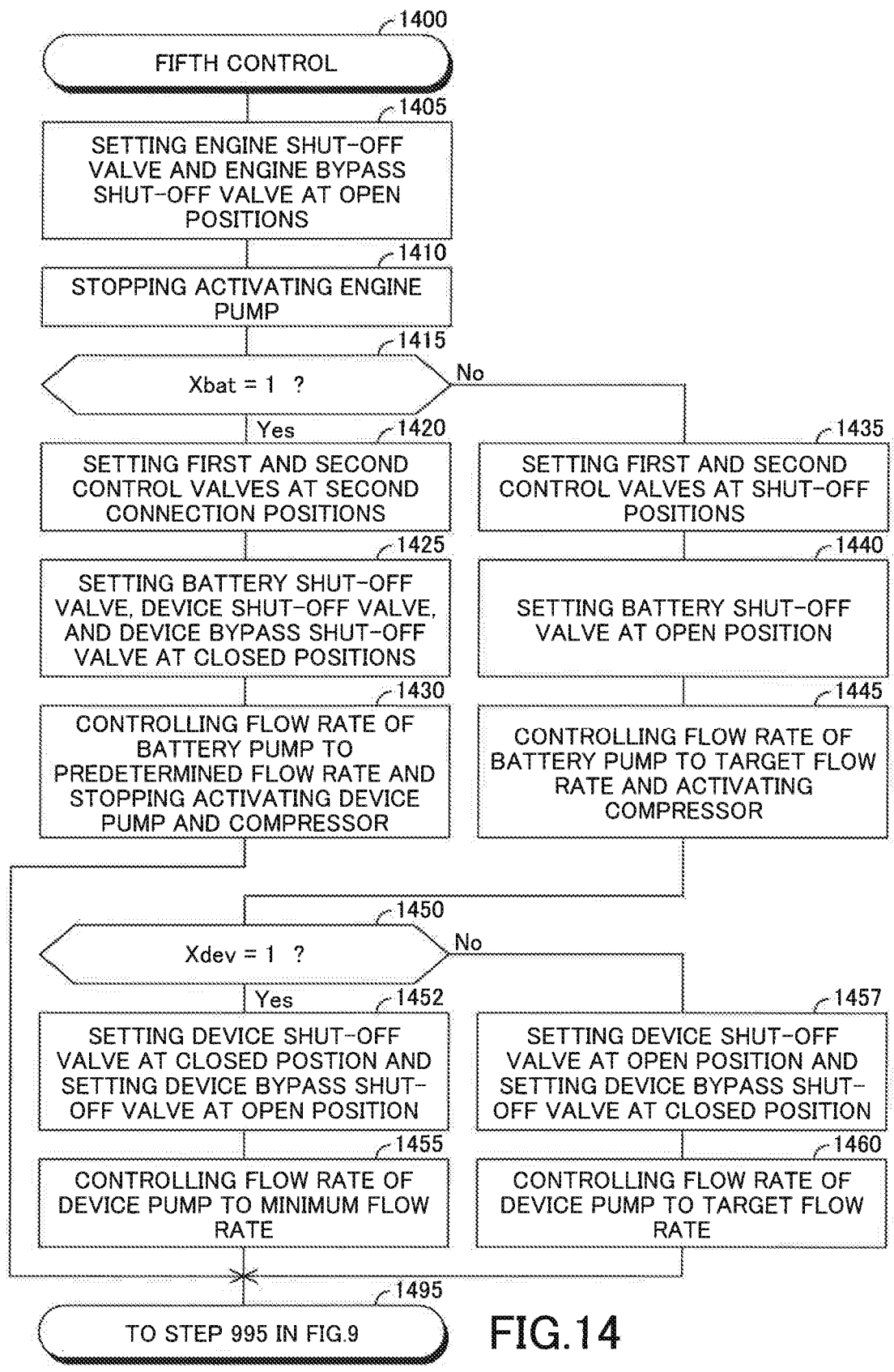
FIG. 14 is a view for showing a flowchart of a routine executed by the CPU.

When the engine 110 is not requested to be operated, and the battery 120 is requested to be used, the CPU determines "Yes" at the step 945 and then, proceeds with the process to a step 950 to execute a routine shown by a flowchart in FIG. 14.

Therefore, when the CPU proceeds with the process to the step 950, the CPU starts a process from a step 1400 in FIG. 14 and then, sequentially executes processes of steps 1405 and 1410 described below. Thereafter, the CPU proceeds with the process to a step 1415.

Step 1405: The CPU sets the engine shut-off valve 14 and the engine bypass shut-off valve 14b at the open positions, respectively.

Step 1410: The CPU stops activating the engine pump 13.

It should be noted that the CPU continues to stop activating the engine pump 13 when the activation of the engine pump 13 is already stopped at a time of executing the process of the step 1410.

When the CPU proceeds with the process to the step 1415, the CPU determines whether the value of the battery warming request flag Xbat is "1". When the value of the battery warming request flag Xbat is "1", the CPU determines "Yes" at the step 1415 and then, sequentially executes processes of steps 1420 to 1430 described below. Thereafter, the CPU proceeds with the process to the step 995 in FIG. 9 via a step 1495 to terminate this routine once.

Step 1420: The CPU sets the first control valve 65 and the second control valve 75 at the second connection positions, respectively.

Step 1425: The CPU sets the battery shut-off valve 24, the device shut-off valve 34, and the device bypass shut-off valve 34b at the closed positions, respectively.

Step 1430: The CPU activates the battery pump 23 and stops activating the device pump 33 and the compressor 43. At this time, the CPU controls the activation of the battery pump 23 so as to control the flow rate Rbat of the cooling water discharged from the battery pump 23 to the predetermined flow rate Rbat_dan.

It should be noted that the CPU continues to activate the battery pump 23 when the battery pump 23 is already activated at a time of executing the process of the step 1430. In addition, the CPU continues to stop activating the device pump 33 when the activation of the device pump 33 is already stopped at the time of executing the process of the step 1430. Similarly, the CPU continues to stop activating the compressor 43 when the activation of the compressor 43 is already stopped at the time of executing the process of the step 1430.

On the other hand, when the value of the battery warming request flag Xbat is "0" at a time of executing a process of the step 1415, the CPU determines "No" at the step 1415 and then, sequentially executes processes of steps 1435 to 1445 described below. Thereafter, the CPU proceeds with the process to a step 1450.

Step 1435: The CPU sets the first control valve 65 and the second control valve 75 at the shut-off positions, respectively.

Step 1440: The CPU sets the battery shut-off valve 24 at the open position.

Step 1445: The CPU activates the battery pump 23 and the compressor 43. At this time, the CPU controls the activation of the battery pump 23 so as to control the flow rate Rbat of the cooling water discharged from the battery pump 23 to the target flow rate Rbat_tgt.

It should be noted that the CPU continues to activate the battery pump 23 when the battery pump 23 is already activated at a time of executing the process of the step 1445. Similarly, the CPU continues to activate the compressor 43 when the compressor 43 is already activated at the time of executing the process of the step 1445.

When the CPU proceeds with the process to the step 1450, the CPU determines whether the value of the device warming request flag Xdev is "1". When the value of the device warming request flag Xdev is "1", the CPU determines "Yes" at the step 1450 and then, sequentially executes processes of steps 1452 and 1455 described below. Thereafter, the CPU proceeds with the process to the step 995 in FIG. 9 via the step 1495 to terminate this routine once.

Step 1452: The CPU sets the device shut-off valve 34 at the closed position and sets the device bypass shut-off valve 34b at the open position.

Step 1455: The CPU activates the device pump 33. At this time, the CPU controls the activation of the device pump 33 so as to control the flow rate Rdev of the cooling water discharged from the device pump 33 to the minimum flow rate Rdev_min.

It should be noted that the CPU continues to activate the device pump 33 when the device pump 33 is already activated at a time of executing the process of the step 1455.

On the other hand, when the value of the device warming request flag Xdev is "0", the CPU determines "No" at the step 1450 and then, sequentially executes processes of steps 1457 and 1460 described below. Thereafter, the CPU proceeds with the process to the step 995 in FIG. 9 via the step 1495 to terminate this routine once.

Step 1457: The CPU sets the device shut-off valve 34 at the open position and sets the device bypass shut-off valve 34b at the closed position.

Step 1460: The CPU activates the device pump 33. At this time the CPU controls the activation of the device pump 33 so as to control the flow rate Rdev discharged from the device pump 33 to the target flow rate Rdev_tgt.

It should be noted that the CPU continues to activate the device pump 33 when the device pump 33 is already activated at a time of executing the process of the step 1460.

Figure 15:
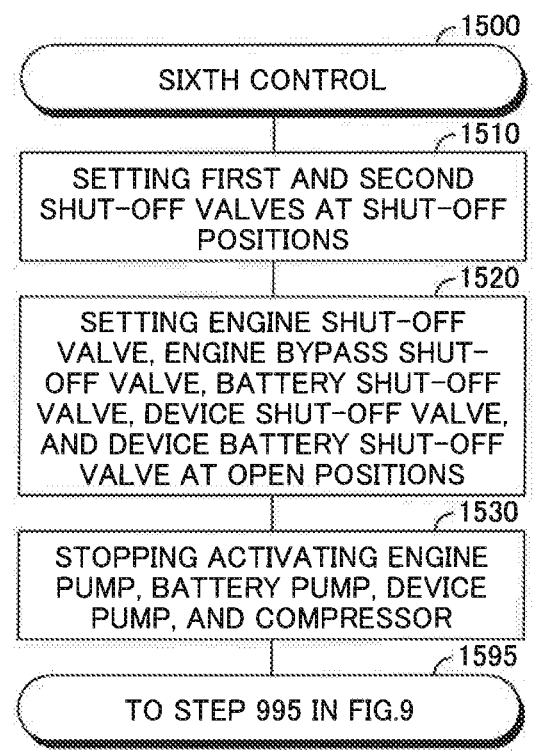
FIG. 15 is a view for showing a flowchart of a routine executed by the CPU.

Referring now to FIG. 9, when the engine 110 is requested to be operated, or the battery 120 is not requested to be used at a time of executing a process of the step 945, the CPU determines "No" at the step 945 and then, proceeds with the process to a step 955 to execute a routine shown by a flowchart in FIG. 15.

Therefore, when the CPU proceeds with the process to the step 955, the CPU starts a process from a step 1500 and then, sequentially executes processes of steps 1510 to 1530. Thereafter, the CPU proceeds with the process to the step 995 in FIG. 9 via a step 1595 to terminate this routine once.

Step 1510: The CPU sets the first control valve 65 and the second control valve 75 at the shut-off positions, respectively.

Step 1520: The CPU sets the engine shut-off valve 14, the engine bypass shut-off valve 14b, the battery shut-off valve 24, the device shut-off valve 34, and the device bypass shut-off valve 34b at the open positions, respectively.

Step 1530: The CPU stops activating the engine pump 13, the battery pump 23, the device pump 33, and the compressor 43.

It should be noted that the CPU continues to stop activating the engine pump 13 when the activation of the engine pump 13 is already stopped at a time of executing the process of the step 1530. Similarly, the CPU continues to stop activating the battery pump 23 when the activation of the battery pump 23 is already stopped at the time of executing the process of the step 1530. Similarly, the CPU continues to stop activating the device pump 33 when the activation of the device pump 33 is already stopped at the time of executing the process of the step 1530. Similarly, the CPU continues to stop activating the compressor 43 when the activation, of the compressor 43 is already stopped at the time of executing the process of the step 1530.

The concrete operation, of the embodiment apparatus has been described. When the embodiment apparatus executes the routine shown in FIG. 10, the cooling water flowing only in the engine circulation circuit 11 is supplied to the engine passage 15, and the cooling water having the relatively high temperature increased in the device passage 35 is supplied to the battery passage 25 until the battery temperature Tbat reaches the connection switching temperature Tbat_th. After the battery temperature Tbat reaches the connection switching temperature Tbat_th, the cooling water having the high temperature increased in the engine passage 15 is supplied to, the battery passage 25. Thus, the amount of the emission included in the exhaust gas discharged from the engine 110 can, be maintained at the small amount until the battery temperature That reaches the battery warming end temperature Tbat_dan. In addition, the battery temperature Tbat reaches the battery warming end temperature Tbat_dan promptly.

It should be noted that the present invention is not limited to the aforementioned embodiment, and various modifications can be employed within the scope of the present invention.

As described above, the embodiment apparatus supplies the heat of the cooling water which has flowed through the engine passage 15 to the cooling water which will flow through the battery passage 25 by connecting the engine circulation circuit 11 and the battery circulation circuit 21 to each other via the heat exchanging system 50.

In this regard, the embodiment apparatus may be configured to include a heat exchanger having a passage for the cooling water which has flowed through the engine passage 15 and a passage for the cooling water which will flow through the battery passage 25. In this case, the embodiment apparatus is configured to supply the heat of the cooling water which has flowed through the engine passage 15 to the cooling water which will flow through the battery passage 25 by flowing the cooling water which has flowed through the engine passage 15 and the cooling water which will flow through the battery passage 25 through the passages of the heat exchanger, respectively.

Further, the embodiment apparatus may be configured to comprise a heat pump including an evaporator provided in the engine circulation circuit 11, a condenser provided in the battery circulation circuit 21, a compressor, and an expansion valve. In this case, the embodiment apparatus is configured to activate the compressor to remove the heat from the cooling water flowing in the engine circulation circuit 11 at the evaporator and supply the removed heat to the cooling water flowing in the battery circulation circuit 21, thereby supplying the heat of the cooling water which has flowed through the engine passage 15 to the cooling water which will flow through the battery passage 25.

Further, as described above, the embodiment apparatus supplies the heat of the cooling water flowing through the device passage 35 to the cooling water flowing through the battery passage 25 by connecting the battery circulation circuit 21 and the device circulation circuit 31 via the heat exchanging system 50.

In this regard, the embodiment apparatus may be configured to comprise a heat exchanger including a passage for the cooling water which has flowed through the battery passage 25 and a passage for the cooling water which will flow through the device passage 35. In this case, the embodiment apparatus is configured to supply the heat of the cooling water which has flowed through the device passage 35 to the cooling water which will flow through the battery passage 25 by flowing the cooling water which has flowed through the battery passage 25 and the cooling water which will flow through the device passage 35 through the passages of the heat exchanger, respectively.

Further, the embodiment apparatus may be configured to comprise a heat pump including an evaporator provided in the device circulation circuit 31, a condenser provided in the battery circulation circuit 21, a compressor, and an expansion valve. In this case, the embodiment apparatus is configured to activate the compressor to remove the heat from the cooling water flowing in the device circulation circuit 31 at the evaporator and supply the removed heat to the cooling water flowing in the battery circulation circuit 21, thereby supplying the heat of the cooling water which has flowed through the engine passage 15 to the cooling water which will flow through the battery passage 25.

Further, any of the first control valve 65 and the second control valve 75 may be omitted from the embodiment apparatus.

Further, as described above, the embodiment apparatus supplies the cooling water which has flowed through the device passage 35 to the battery passage 25 until the battery temperature Tbat reaches the connection switching temperature Tbat_th when the battery 120 is requested to be warmed, and the engine 110 is requested to be warmed.

In this regard, the embodiment apparatus may be configured to supply the cooling water flowing only in the battery circulation circuit 21 to the battery passage 25 by setting the first control valve 65 and the second control valve 75 at the shut-off positions, respectively, setting the battery shut-off valve 24 at the open position, and activating the battery pump 23 until the battery temperature Tbat reaches the connection switching temperature Tbat_th when the battery 120 is requested to be warmed, and the engine 110 is requested to be warmed. In this case, the embodiment apparatus controls the activation of the battery pump 23 so as to control the flow rate Rbat of the cooling water discharged from the battery pump 23 to the minimum flow rate Rbat_min. In addition, the embodiment apparatus may be configured to set the device shut-off valve 34 at the open, position and activate the device pump 33. In this case, the embodiment apparatus controls the activation of the device pump 33 so as to control the flow rate Rdev of the cooling water discharged from the device pump 33 to the minimum flow rate Rdev_min.

Figure 16:
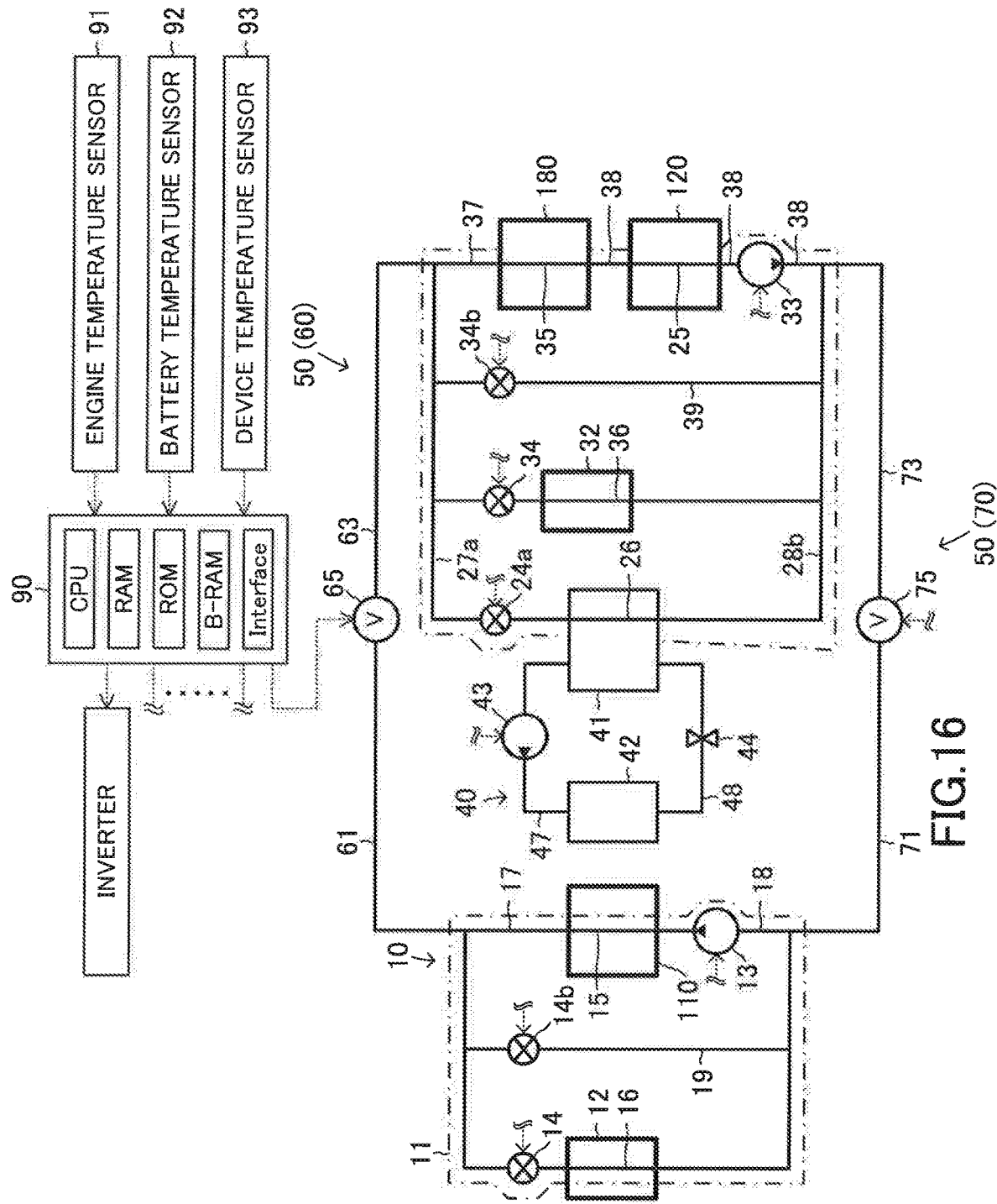
FIG. 16 is a view for showing a temperature control apparatus, to which the invention can be applied.

Further, the invention may be applied to the temperature control apparatus shown in FIG. 16. In this case, the battery 120 is provided such that the battery passage 25 formed in the battery 120 is included in the second device circulation passage 38 between the device passage 35 and the device pump 33. In addition, the heat medium outlet of the evaporator passage 26 and the first device circulation passage 37 are connected to each other by a first evaporator circulation passage 27a, and the heat medium inlet of the evaporator passage 26 and the second device circulation passage 38 are connected to each other by a second evaporator circulation passage 28b. In addition, an evaporator shut-off valve 24a is provided in the first evaporator circulation passage 27a.

When the evaporator shut-off valve 24a is set at an open position, the first evaporator circulation passage 27a is open. Thus, the cooling water discharged from the evaporator passage 26 can flows into the first device circulation passage 37 through the first evaporator circulation passage 27a. On the other hand, when the evaporator shut-off valve 24a is set at a closed position, the first evaporator circulation passage 27a is closed. Thus, the cooling water cannot flow into the first device circulation passage 37 from the evaporator passage 26 through the first evaporator circulation passage 27a.

Further, in this temperature control apparatus, when the first control valve 65 is set at the first connection position, the first engine circulation passage 17 communicates with the first device circulation passage 37 via the first connection passage 61, the interior passage of the first control valve 65, and the third connection passage 63.

When the first control valve 65 is set at the shut-off position, a communication of the first engine circulation passage 17 with the first device circulation passage 37 is shut-off.

When the second control valve 75 is set at the first connection position, the second device circulation passage 38 communicates with the second engine circulation passage 18 through the third connection passage 73, the interior passage of the second control valve 75, and the first connection passage 71.

When the second control valve 75 is set at the shut-off position, a communication of the second device circulation passage 38 with the second engine circulation passage 18 is shut-off.

This temperature control apparatus sets the first control valve 65 and the second control valve 75 at the shut-off positions, respectively until the battery temperature Tbat reaches the connection switching temperature Tbat_th when the battery 120 is requested to be warmed, and the engine 110 is requested to be warmed. In addition, the temperature control apparatus sets the evaporator shut-off valve 24a and the device shut-off valve 34 at the closed positions, respectively, sets the device bypass shut-off valve 34b at the open position, and activates the device pump 33. At this time, the temperature control apparatus continues to stop activating the compressor 43. In addition, the temperature control apparatus sets the engine shut-off valve 14 at the closed position, sets the engine bypass shut-off valve 14b at the open position, and activates the engine pump 13.

Figure 17:
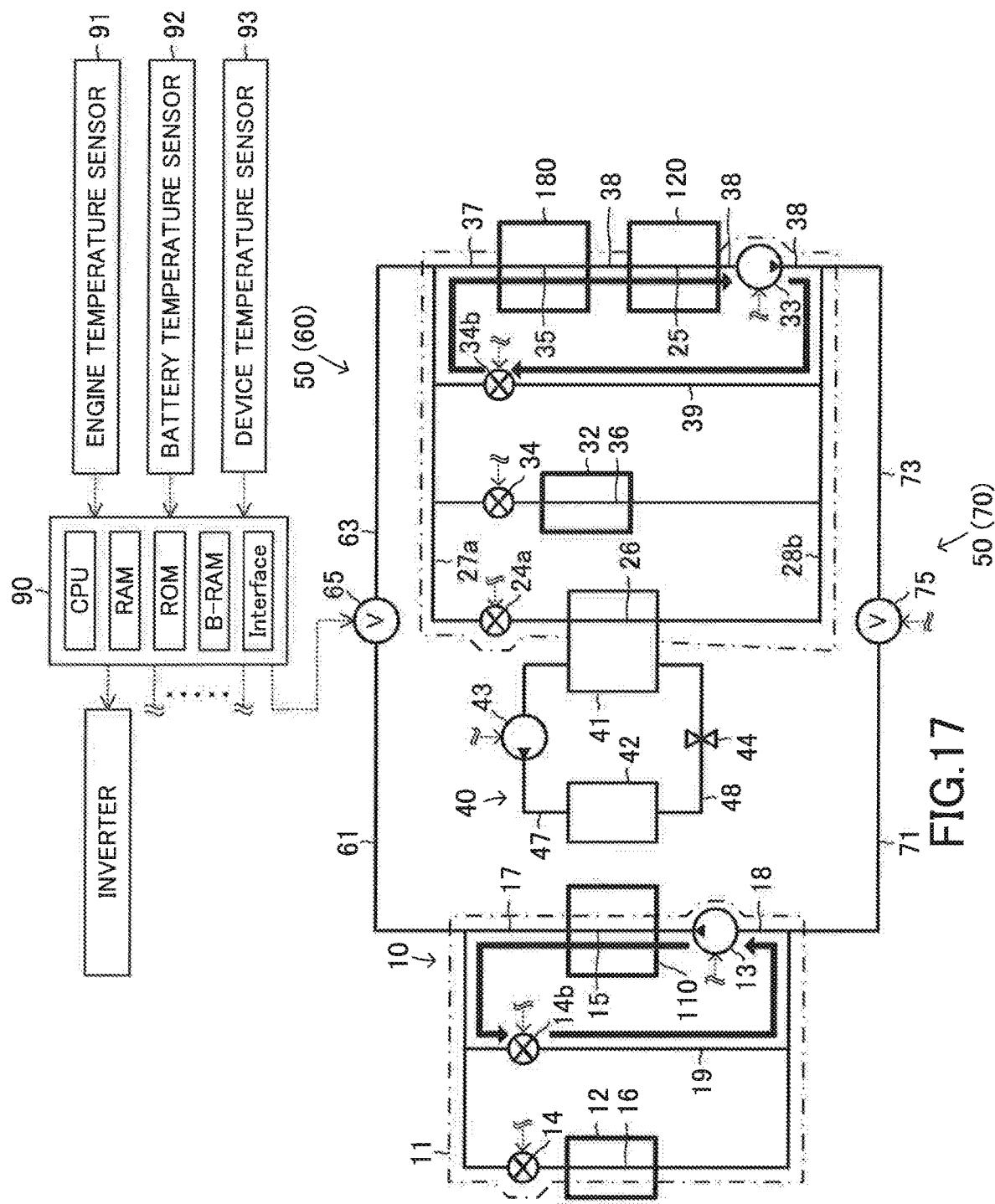
FIG. 17 is a view similar to FIG. 16 for showing the flow of cooling water.

Thereby, the cooling water discharged from the device pump 33 flows, as shown by arrows in FIG. 17. In particular, the cooling water discharged from the device, pump 33 flows through the second device circulation passage 38, the device bypass passage 39, the first device circulation passage 37, the device passage 35, the second device circulation passage 38, the battery passage 25, and the second device circulation passage 38 and flows into the device pump 33.

At this time, the temperature control apparatus controls the activation, of the device pump 33 so as to control the flow rate Rdev of the cooling water discharged from the device pump 33 to the minimum flow rate Rdev_min.

Thereby, the cooling water having the minimum flow rate Rdev_min is supplied to the device passage 35 without flowing through the device radiator passage 36, and the cooling water heated in the device passage 35 by the hybrid device 180 is supplied to the battery passage 25. In addition, the flow rate Rdev of the cooling water discharged from the device pump 33 is controlled to the minimum flow rate Rdev_min. Thus, the battery temperature Tbat increases toward the battery warming end temperature Tbat_dan.

The cooling water discharged from the engine pump 13 flows as shown by the arrows in FIG. 17. In particular, the cooling water discharged from the engine pump 13 flows the second engine circulation passage 18, the engine passage 15, the first engine circulation passage 17, the engine bypass passage 19, and the second engine circulation passage 18 and flows into the engine pump 13.

In this case, the control temperature apparatus controls the activation of the engine pump 13 so as to control the flow rate Reng of the cooling water discharged from the engine pump 13 to the minimum flow rate Reng_min.

Thereby, the cooling water having the minimum flow rate Reng_min is supplied to the engine passage 15 without flowing through the engine radiator passage 16. Thus, the engine temperature Teng increases toward the engine warming end temperature Teng_dan.

When the battery temperature Tbat reaches the connection switching temperature Tbat_th, the temperature control apparatus sets the first control valve 65 and the second control valve 75 at the first connection positions, respectively. In addition, the temperature control apparatus maintains the engine shut-off valve 14, the evaporator shut-off valve 24a, and the device shut-off valve 34 at the closed positions, respectively and sets the engine bypass shut-off valve 14b and the device bypass shut-off valve 34b at the closed positions, respectively. In addition, the temperature control apparatus continues to activate the engine pump 13, stop activating the compressor 43, and stops activating the device pump 33.

Figure 18:
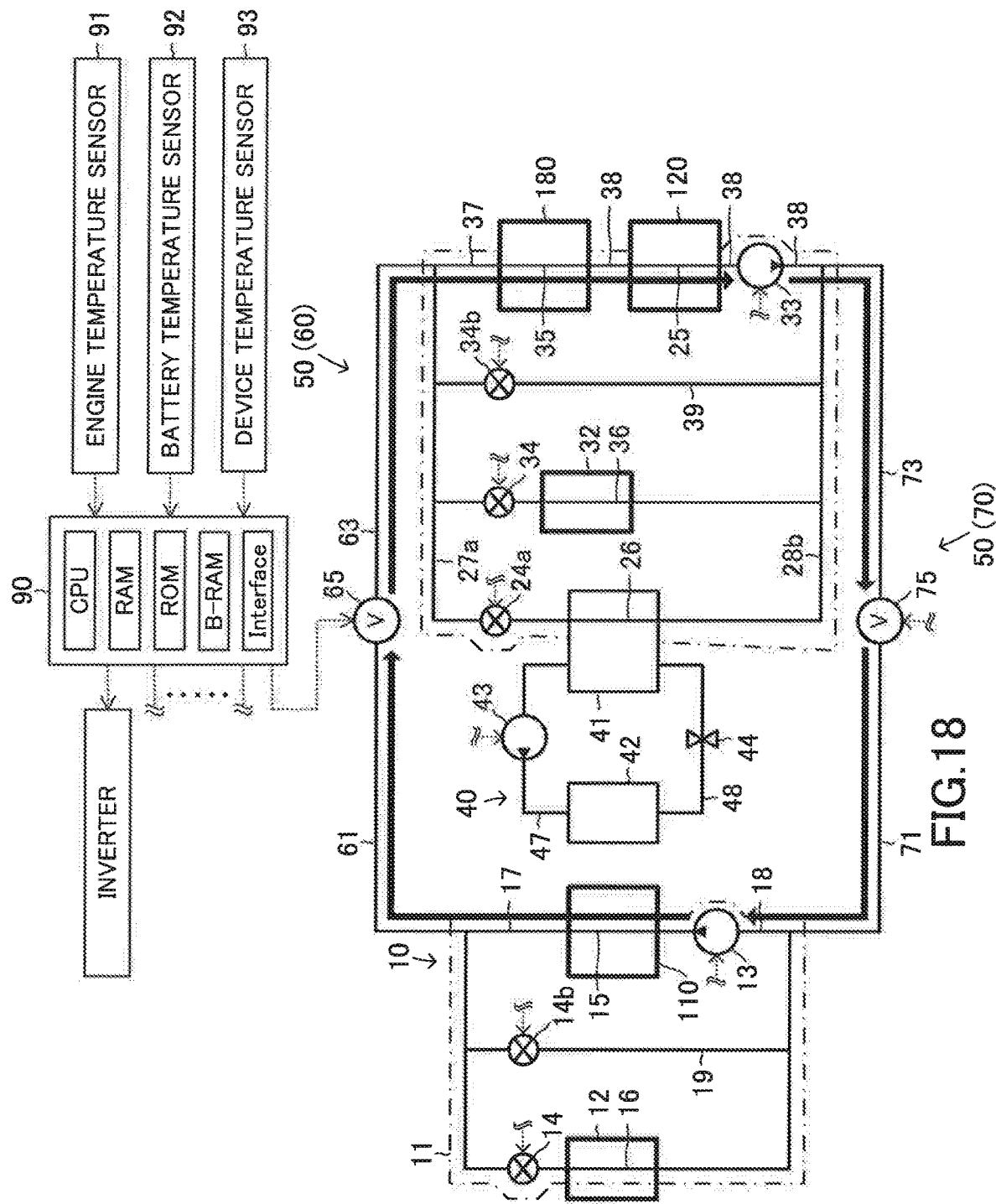
FIG. 18 is a view similar to FIG. 16 for showing the flow of the cooling water.

Thereby, the cooling water discharged from the engine pump 13 flows as shown by arrows in FIG. 18.

In particular, the cooling water discharged from the engine pump 13 flows through the second engine circulation passage 18, the engine passage 15, the first engine circulation passage 17, the first connection passage 61, the interior passage of the first control valve 65, the third connection passage 63, the first device circulation passage 37, the device passage 35, the second device circulation passage 38, the battery passage 25, the second device circulation passage 38, the third connection passage 73, the interior passage of the second control valve 75, the first connection passage 71, and the second engine circulation passage 18 and flows into the engine pump 13.

In this case, the temperature control apparatus controls the activation of the engine pump 13 so as to control the flow rate Reng of the cooling water discharged from the engine pump 13 to the predetermined flow rate Reng_dan. The predetermined flow rate Reng_dan is set as the flow rate suitable for increasing the battery temperature Tbat by the cooling water which has flowed through the engine passage 15 and will be supplied to the battery passage 25. The predetermined flow rate Reng_dan is, for example, previously determined by an experiment.

Thereby, the cooling water heated in the engine passage 15 by the engine 110 is supplied to the battery passage 25. In addition, the flow rate Reng of the cooling water discharged from the engine pump 13 is controlled to the flow rate (that is, the predetermined flow rate Reng_dan) suitable for increasing the battery temperature Tbat. Thus, the battery temperature Tbat increases toward the battery warming end temperature Tbat_dan.

Thereby, the same technical effects as those of the embodiment apparatus can be obtained.

Further, the embodiment apparatus may include a heating device for supplying heat for warming an interior of the vehicle 100. In this case, the heating device includes a heating circuit, in which the cooling water flowing out from the engine passage 15 flows, and a heater core provided in the heating circuit. The heater core is heated by the heat of the cooling water flowing out from the engine passage 15. When the interior of the vehicle 100 is requested to be warmed by a driver of the vehicle 100, the air is supplied to the heater core. As a result, the air is warmed. The warmed air is supplied to the interior of the vehicle 100.

Further, the heating device may include an electric heater for electrically heating the cooling water flowing through the heater core.

Further, the heat pump 40 of the embodiment apparatus may include an evaporator for cooling the cooling water flowing in the engine circulation circuit 11. Further, the heat pump 40 of the embodiment apparatus may include a condenser for heating the cooling water flowing in the engine circulation circuit 11. Furthermore, the heat pump 40 of the embodiment apparatus may include an evaporator for cooling the interior of the vehicle 100.

What is claimed is:

1. A temperature control apparatus of a vehicle, the temperature control apparatus comprising:
   an engine circulation circuit including an engine passage in an internal combustion engine of the vehicle, a first cooling passage in a first cooling system, and a cooling medium flowing in the engine circulation circuit;
   a battery circulation circuit including a battery passage in a battery of the vehicle, a second cooling passage in a second cooling system, and a cooling medium flowing in the battery circulation circuit;
   an engine heat exchanging system to perform an engine heat exchanging to exchange heat between the cooling medium flowing in the engine circulation circuit and the cooling medium flowing in the battery circulation circuit; and
   an electronic control unit configured to;
      control an activation of the engine heat exchanging system;
      control a flow of the cooling medium flowing in the engine circulation circuit to control a temperature of the internal combustion engine to a temperature within a predetermined engine temperature range by heat exchange between the cooling medium and the internal combustion engine;
      control a flow of the cooling medium flowing in the battery circulation circuit to control a temperature of the battery to a temperature within a predetermined battery temperature range by heat exchange between the cooling medium and the battery;
      control the flow of the cooling medium in the engine circulation circuit, the flow of the cooling medium in the battery circulation circuit and the activation of the engine heat exchanging system so as to perform the engine heat exchanging when the temperature of the internal combustion engine is equal to or higher than an engine warming end temperature, and the temperature of the battery is lower than a battery warming end temperature, the engine warming end temperature being a lower limit temperature of the predetermined engine temperature range and the battery warming end temperature being a lower limit temperature of the predetermined battery temperature range;

control the flow of the cooling medium in the engine circulation circuit, the flow of the cooling medium in the battery circulation circuit, and the activation of the engine heat exchanging system so as not to perform the engine heat exchanging when the temperature of the internal combustion engine is lower than the engine warming end temperature, and the temperature of the battery is lower than a predetermined battery temperature lower than the battery warming end temperature; and control the flow of the the cooling medium in the engine circulation circuit, the flow of the cooling medium in the battery circulation circuit, and the activation of the engine heat exchanging system so as to perform the engine heat exchanging when the temperature of the internal combustion engine is lower than the engine warming end temperature, and the temperature of the battery is equal to or higher than the predetermined battery temperature.

2. The temperature control apparatus as set forth in claim 1, wherein the engine heat exchanging system includes:

a first engine connection passage to connect the engine circulation circuit and the battery circulation circuit to each other so as to supply the cooling medium from the engine circulation circuit to the battery circulation circuit;

a second engine connection passage to connect the engine circulation circuit and the battery circulation circuit to each other so as to discharge the cooling medium from the battery circulation circuit to the engine circulation circuit; and an engine connection control valve to control a connection between the engine circulation circuit and the battery circulation circuit; and the electronic control unit is configured to:

control the activation of the engine heat exchanging system so as not to perform the engine heat exchanging by controlling an activation of the engine connection control valve so as to shut off any of a communication between the engine circulation circuit and the battery circulation circuit via the first engine connection passage and a communication between the engine circulation circuit and the battery circulation circuit via the second engine connection passage; and control the activation of the engine heat exchanging system so as to perform the engine heat exchanging by controlling the activation of the engine connection control valve so as to communicate the engine circulation circuit and the battery circulation circuit with each other via the first engine connection passage and the second engine connection passage.

3. The temperature control apparatus as set forth in claim 1, wherein the electronic control unit is configured to control a flow rate of the cooling medium flowing in the engine circulation circuit to a minimum flow rate when the temperature of the internal combustion engine is lower than the engine warming end temperature, and the temperature of the battery is lower than the predetermined battery temperature.

4. The temperature control apparatus as set forth in claim 1, wherein the first cooling system includes a radiator provided in the engine circulation circuit.

5. The temperature control apparatus as set forth in claim 1, wherein the second cooling system includes a heat pump including an evaporator in the battery circulation circuit, a condenser, a compressor, and an expansion valve.

6. The temperature control apparatus as set forth in claim 1, wherein the vehicle comprises a device including an electric motor, the temperature control apparatus further comprises:

a device circulation circuit including a passage in the device, a passage in a third cooling system, and a cooling medium flowing in the device circulation circuit to control a temperature of the device by heat exchange to a temperature within a predetermined device temperature range; and a device heat exchanging system to perform a device heat exchanging to exchange heat between the cooling medium flowing in the device circulation circuit and the cooling medium flowing in the battery circulation circuit, and the electronic control unit is configured to:

control the flow of the cooling medium in the engine circulation circuit, the flow of the cooling medium in the device circulation circuit, the flow of the cooling medium in the battery circulation circuit, and the activation of the engine heat exchanging system so as not to perform the engine heat exchanging, and control activation of the device heat exchanging system so as to perform the device heat exchanging when the temperature of the internal combustion engine is lower than the engine warming end temperature, and the temperature is lower than the predetermined temperature; and control the flow of the cooling medium in the engine circulation circuit, the flow of the cooling medium in the battery circulation circuit, and control the activation of the engine heat exchanging system so as to perform the engine heat exchanging when the temperature of the battery reaches the predetermined battery temperature while the temperature of the internal combustion engine is lower than the engine warming end temperature.

7. The temperature control apparatus as set forth in claim 6, wherein the device heat exchanging system includes:

a first device connection passage to connect the device circulation circuit and the battery circulation circuit to each other so as to supply the cooling medium from the device circulation circuit to the battery circulation circuit;

a second device connection passage to connect the device circulation circuit and the battery circulation circuit to each other so as to discharge the cooling medium from the battery circulation circuit to the device circulation circuit; and a device connection control valve to control a connection between the device circulation circuit and the battery circulation circuit; and the electronic control unit is configured to control the activation of the device heat exchanging system so as not to perform the device heat exchanging by controlling the activation of the device connection control valve so as to communicate the device circulation circuit and the battery circulation circuit with each other via the first device connection passage and the second device connection passage.

* * * * *